(12) United States Patent
Dmochowski

(10) Patent No.: US 6,317,643 B1
(45) Date of Patent: Nov. 13, 2001

(54) MANUFACTURING AND ENGINEERING DATA BASE

(75) Inventor: Michael Joseph Dmochowski, Wyomissing, PA (US)

(73) Assignee: Agere Systems Guardian Corp., Orlando, FL (US)

(*) Notice: Subject to any disclaimer, the term of this patent is extended or adjusted under 35 U.S.C. 154(b) by 0 days.

(21) Appl. No.: 09/281,642

(22) Filed: Mar. 31, 1999

(51) Int. Cl.$^7$ ..................................... G06F 19/00
(52) U.S. Cl. ................ 700/121; 700/100; 700/108; 705/7
(58) Field of Search .............. 700/95–97, 99–108, 700/111, 121; 705/7–9; 29/25.01

(56) References Cited

U.S. PATENT DOCUMENTS

| | | | |
|---|---|---|---|
| 5,195,041 | * 3/1993 | George et al. | 700/100 |
| 5,980,591 | * 11/1999 | Akimoto et al. | 29/25.01 |

* cited by examiner

Primary Examiner—William Grant
Assistant Examiner—Steven R. Garland

(74) Attorney, Agent, or Firm—Walter J. Tencza, Jr.

(57) ABSTRACT

A method comprised of storing a first time and a first indicia, the first time being the time it takes a first number of products to be subjected to a first subprocess and the first indicia being an indication of how many products are in the first number of products. The method may also include storing a second time and a second indicia, the second time being the time it takes a second number of products to be subjected to a second subprocess. The first and second times may be average times for a plurality of different processes. The second indicia can be an indication of how many products are in the second number of products. The method may also include storing a third indicia, the third indicia being an indication of how many products are in a third number of products to be subjected to a first process. The first process may be comprised of the first and second subprocesses. A run time is determined for the third number of products to be subjected to the first process based on the first and second times, and the first, second and third indicia. The present invention also includes an apparatus comprised of a first memory, a second memory, and a first computer processor. The first computer processor may ignore a first average time for the first subprocess and use a first process specific time for determining the run time of the first process when an first override flag in the first memory is set.

17 Claims, 15 Drawing Sheets

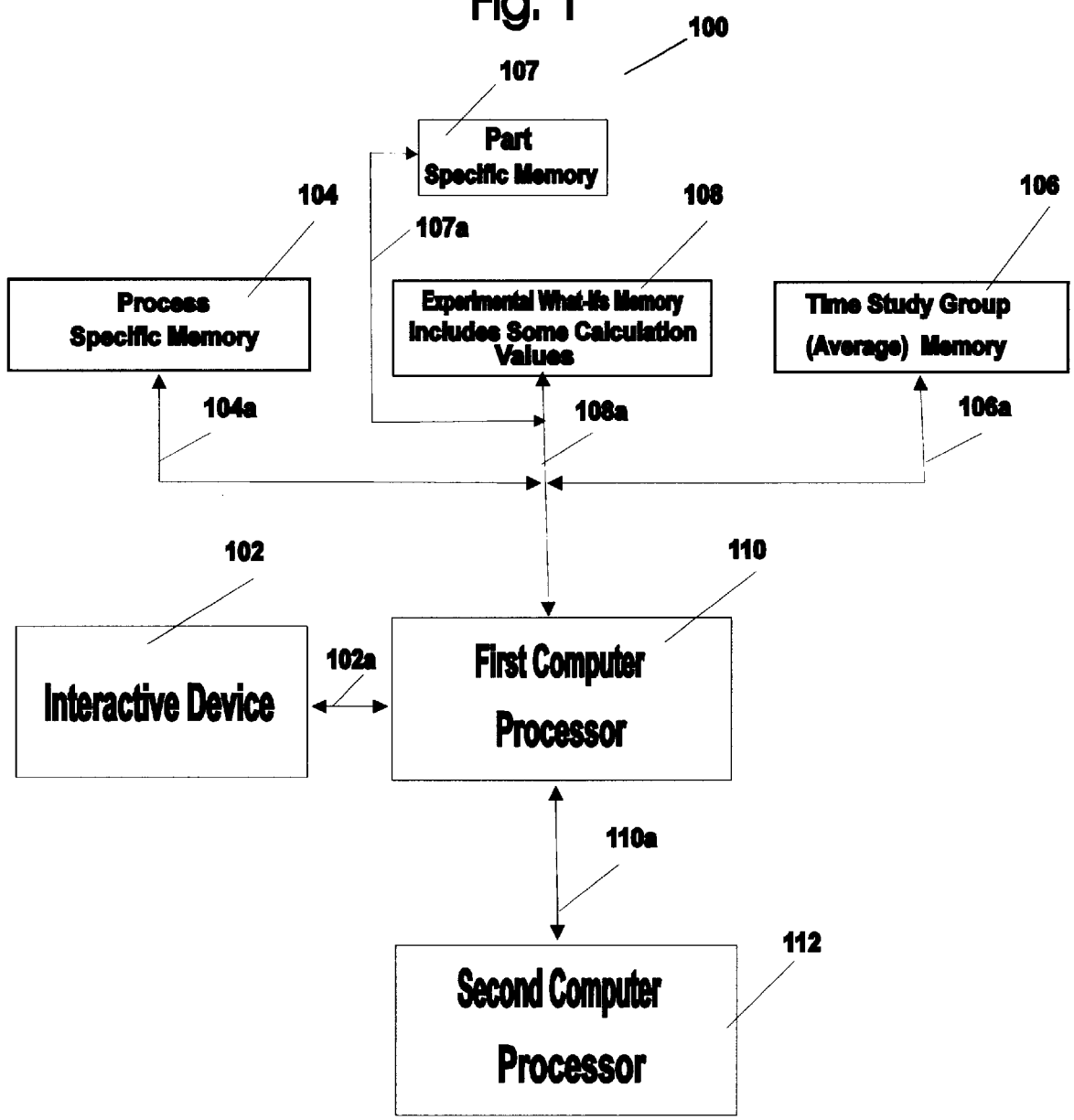

Fig. 2

| SUBPROCESS TYPE | NO. | PROCESS DEP? | SUBPROCESS | 1:MEAN TIME | TIME PER | SUBLOT OR FLASH VOL. | STAGING | BIB | LABOR REQ'D | LABOR % | OVER-RIDE | PATH 1 | PATH 2 | SETUP ID NAME | WHEN |
|---|---|---|---|---|---|---|---|---|---|---|---|---|---|---|---|
| Transbfr | 1 | | Select | 20.0 | lot | | Y | | Y | | | | | | |
| Transbfr | 2 | | Get lot from WIP rack | 40.0 | lot | | Y | | Y | | | | | | |
| Transbfr | 3 | | Begin in PC | 30.0 | lot | | Y | | Y | | | | | | |
| Transbfr | 4 | Y | Measurement | 0.0 | batch | | Y | | Y | | | | | | |
| Load | 5 | | Flat find | 20.0 | sublot | 25 | Y | | Y | | | | | | |
| Xload | 6 | | Load | 30.0 | batch | | | Y | | | | | | | |
| Xload | 7 | | Load Recipe | 30.0 | batch | | | Y | Y | 30% | | | | | |
| Xload | 8 | | Wait in cassette for first transfer | 51.7 | batch | | | Y | | | | | | | |
| Xload | 9 | | First transfer from cassette to elevator | 6.5 | wafer | | | Y | | | 0 | | | | |
| Xload | 10 | | First Pump Down | 45.0 | batch | | | Y | | | 0 | | | | |
| Process | 11 | Y | Transfer from cassette to elevator | 6.5 | wafer | | | Y | | | | | 6 | | |
| Process | 12 | Y | Pump down | 45.0 | sublot | | | Y | | | 1 | 1 | 999 | | |
| Process | 13 | Y | Transfer from elevator to etch | 12.8 | wafer | | | Y | | | 1 | 1 | 2 | | |
| Process | 14 | Y | Wafer positioning | 13.5 | wafer | | | Y | | | 1 | 1 | | | |
| Process | 15 | Y | Etch | 240.0 | wafer | | | Y | | | 5 | 1 | | | |
| Process | 16 | Y | Transfer from etch to elevator | 14.8 | wafer | | | Y | | | | | 999 | | |
| Process | 17 | Y | Pump Up (Vent) | 47.0 | sublot | | | Y | | | | | 6 | | |
| Process | 18 | Y | Transfer from elevator to cassette | 7.5 | wafer | | | Y | | | 0 | | | | |
| Xunload | 19 | | Last Pump Up (Vent) | 47.0 | batch | | | Y | | | 0 | | | | |
| Xunload | 20 | | Last transfer from elevator to cassette | 7.5 | wafer | | | Y | | | | | | | |
| Unload | 21 | | Unload | 25.0 | batch | | | Y | Y | | | | | | |
| Unload | 22 | | Measurement | 300.0 | batch | | Y | | Y | | | | | | |
| Unload | 23 | | Inspection | 240.0 | batch | | Y | | Y | | | | | | |
| Transaft | 24 | | Yield | 25.0 | batch | | Y | | Y | | | | | | |
| Transaft | 25 | | Deliver to WIP rack | 60.0 | batch | | Y | | Y | | | | | | |

Fig. 3

|  |  |  |  | FREQUENCIES PER RUN | | | |
|---|---|---|---|---|---|---|---|
| NO | SUBPROCESS DESCRIPTION | NORMAL CALC | OVER-RIDE | PATH 1 | PATH 2 | SETUP MULTIPLIER | STAGE OR CASCADE DIVISOR | COMBINED FREQUENCY |
| 1 | Select | 1 |  |  |  |  |  | 1 |
| 2 | Get lot from WIP rack | 1 |  |  |  |  |  | 1 |
| 3 | Begin in PC | 1 |  |  |  |  | 1 | 1 |
| 4 | Measurement | 1 |  |  |  |  | 1 | 1 |
| 5 | Flat find | 1 |  |  |  |  | 1 | 1 |
| 6 | Load | 1 |  |  |  |  | 1 | 1 |
| 7 | Load Recipe | 1 |  |  |  |  |  | 1 |
| 8 | Wait in cassette for first transfer | 1 |  |  |  |  |  | 1 |
| 9 | First transfer from cassette to elevator | 25 | 0 |  |  |  |  |  |
| 10 | First Pump Down | 1 | 0 |  |  |  |  |  |
| 11 | Transfer from cassette to elevator | 25 |  |  | 25 |  |  |  |
| 12 | Pump down | 5 |  | 5 | 5 |  |  | 10 |
| 13 | Transfer from elevator to etch | 25 | 5 | 5 | 9 |  |  | 10 |
| 14 | Wafer positioning | 25 | 5 | 5 |  |  |  | 10 |
| 15 | Etch | 25 | 21 |  |  |  |  | 21 |
| 16 | Transfer from etch to elevator | 25 |  |  | 5 |  |  |  |
| 17 | Pump Up (Vent) | 5 |  |  | 25 |  |  |  |
| 18 | Transfer from elevator to cassette | 25 | 0 |  |  |  |  |  |
| 19 | Last Pump Up (Vent) | 1 | 0 |  |  |  |  |  |
| 20 | Last transfer from elevator to cassette | 25 |  |  |  |  |  |  |
| 21 | Unload | 1 |  |  |  |  | 1 | 1 |
| 22 | Measurement | 1 |  |  |  |  | 1 | 1 |
| 23 | Inspection | 1 |  |  |  |  | 1 | 1 |
| 24 | Yield | 1 |  |  |  |  | 1 | 1 |
| 25 | Deliver to WIP rack | 1 |  |  |  |  |  | 1 |

Fig. 4

| # | SUBPROCESS DESCRIPTION | TIMES (in sec.) PER RUN ||||| PARALLEL CALC ||
|---|---|---|---|---|---|---|---|---|
| | | BIB | MACHINE | LOT INTERVAL | LABOR | THEOR. | PATH 1 | PATH 2 |
| 1 | Select | | | | 20.0 | | | |
| 2 | Get lot from WIP rack | | 20.0 | 20.0 | 20.0 | | | |
| 3 | Begin in PC | | 40.0 | 40.0 | 40.0 | | | |
| 4 | Measurement | | 30.0 | 30.0 | 30.0 | | | |
| 5 | Flat find | | 20.0 | 20.0 | 20.0 | | | |
| 6 | Load | 30.0 | 30.0 | 30.0 | 30.0 | 30.0 | | |
| 7 | Load Recipe | 30.0 | 30.0 | 30.0 | 9.0 | 30.0 | | |
| 8 | Wait in cassette for first transfer | 51.7 | 51.7 | 51.7 | | 51.7 | | |
| 9 | First transfer from cassette to elevator | | | | | | | 163 |
| 10 | First Pump Down | | | | | | | 225 |
| 11 | Transfer from cassette to elevator | | | | | | 64.2 | 116 |
| 12 | Pump down | | | | | | 67.5 | |
| 13 | Transfer from elevator to etch | 128 | 128 | 128 | | 128 | 1200 | |
| 14 | Wafer positioning | 135 | 135 | 135 | | 135 | | |
| 15 | Etch | 2400 | 2400 | 2400 | | 2400 | | |
| 16 | Transfer from etch to elevator | 311 | 311 | 311 | | 311 | | 235 |
| 17 | Pump Up (Vent) | | | | | | | 188 |
| 18 | Transfer from elevator to cassette | | | | | | | |
| 19 | Last Pump Up (Vent) | | | | | | | |
| 20 | Last transfer from elevator to cassette | | | | | | | |
| 21 | Unload | 25.0 | 25.0 | 25.0 | 25.0 | | | |
| 22 | Measurement | | 300 | 300 | 300 | | | |
| 23 | Inspection | | 240 | 240 | 240 | | | |
| 24 | Yield | | | 25.0 | 25.0 | | | |
| 25 | Deliver to WIP rack | | | 60.0 | 60.0 | | | |
| | TOTALS | 3111.5 | 3761.5 | 3846.5 | 799 | 3086.5 | 1331.666667 | 925.5 |

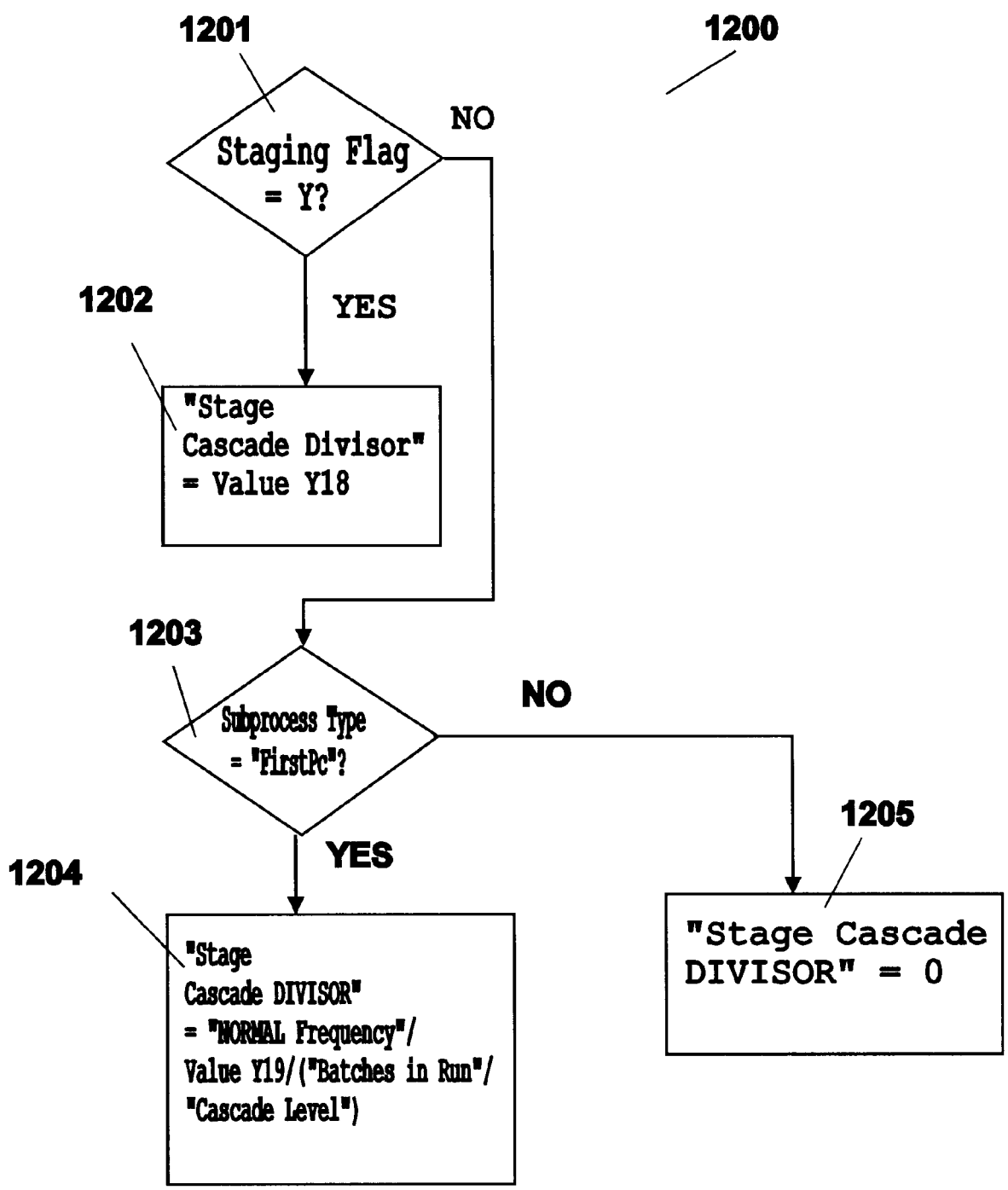

US 6,317,643 B1

MANUFACTURING AND ENGINEERING DATA BASE

FIELD OF THE INVENTION

This invention relates to methods and apparatus of inputting data, calculating various information based on that data, and summarizing and storing data.

BACKGROUND OF THE INVENTION

Various methods and apparatus are known in the art for summarizing and storing data. However, none are adequate.

SUMMARY OF THE INVENTION

The present invention in one embodiment includes a method comprised of the step of storing a first time and a first indicia, the first time being the time it takes a first number of products to be subjected to a first subprocess. The first indicia can be an indication of how many products are in the first number of products. The method may also include storing a second time and a second indicia, the second time being the time it takes a second number of products to be subjected to a second subprocess. The second indicia can be an indication of how many products are in the second number of products. The method may also include storing a third indicia, the third indicia being an indication of how many products are in a third number of products to be subjected to a first process. The first process may be comprised of the first and second subprocesses. The method may also include the step of determining a run time for the third number of products to be subjected to the first process based on the first and second times, and the first, second, and third indicia. The method may further include determining a fourth indicia, the fourth indicia being an indication of how many times the first subprocess needs to be repeated during the first process in order to process the third number of products, and determining a fifth indicia, the fifth indicia being an indication of how many times the second subprocess needs to be repeated during the first process in order to process the third number of products.

A plurality of further times and a corresponding plurality of further indicia may be stored wherein each of the plurality of further times is a time it takes for one of a plurality of further numbers of products to be subjected to one of a plurality of further subprocesses. The plurality of further indicia may be an indication of how many products are in each of the plurality of further numbers of products. The run time for the third number of products to be subjected to the first process can be determined based on the plurality of further times and the plurality of further indicia. The method of an embodiment of the present invention may be applied to semiconductor wafers. A new run time based on a new first time, the second time, and the first, second, and third indicia may be determined. The new run time may be compared with the original run time to determine if the original first time needs to be replaced. The first and second time may be first and second average times it takes for a first and second number of products to be subjected to a first and second subprocess, respectively, for a plurality of different processes.

The present invention also includes a method of storing a first average time and a first indicia; the first average time can be the average time it takes for a first number of products to be subjected to a first subprocess for a plurality of different processes. The first indicia can be an indication of how many products are in the first number of products. The method also includes storing a second average time and a second average indicia, wherein the second average time is the average time it takes a second number of products to be subjected to a second subprocess for a plurality of different processes. The second indicia may be an indication of how many products are in the second number of products. The method may further include storing a third indicia, the third indicia being an indication of how many products are in a third number of products to be subjected to a first process. The first process may be comprised of the first and second subprocesses. The method also includes storing a first override flag for the first process which when activated indicates that the first average time should be replaced by a first process specific time. A run time may also be determined for the third number of products to be subjected to the first process based on the first process specific time if the first override flag is set, and based on the second average time, and the first, second, and third indicia. The run time may be determined based on the first average time when the first override flag is not set.

The present invention also includes an apparatus comprised of a process specific memory, an average memory, a first computer processor, and an interactive device. The process specific memory includes a first process specific time for a first subprocess as occurring within a first process and a first override flag. The average memory may include a first average time for the first subprocess as occurring within a plurality of processes. The first computer processor ignores the first average time for the first subprocess and uses the first process specific time for determining the run time of the first process when the first override flag in the process specific memory is set. In this embodiment, the first process includes the first subprocess.

In general, the present invention can determine processing times and processing characteristics of a facility, piece of equipment and/or overall process. This is accomplished in one embodiment by identifying the various subprocesses that are necessary to complete a process on the machine or machines. These subprocesses are usually readily observable through the use of Industrial Engineering time study techniques. The present invention can then dynamically calculate the frequency or number of times that a subprocess is repeated during a run. Each subprocess average time is multiplied by its appropriate frequency and the results are summed up to arrive at the total processing times and processing characteristics of the equipment. Since machines or manufacturing equipment generally has the capability of doing so many different unique processes it becomes a rather large task to observe each and every particular process that could ever run on the particular machine. Using the present invention and a deductive process, all of the different overall processes can be characterized by observing, recording and storing only a few representative subprocesses, representing a large saving in time and expense.

BRIEF DESCRIPTION OF THE DRAWINGS

FIG. 1 shows a diagram of an apparatus in accordance with a first embodiment of the present invention;

FIG. 2 shows a table of data for a plurality of subprocesses;

FIG. 3 shows a table of run frequencies for a plurality of subprocesses;

FIG. 4 shows a table of run times for a plurality of subprocesses of a specific overall process and total run times for a specific overall process or an average overall process;

FIG. 12 shows a flow chart of a method of determining the Stage Cascade Divisor for a particular subprocess;

DETAILED DESCRIPTION OF THE DRAWINGS

Figure 5:
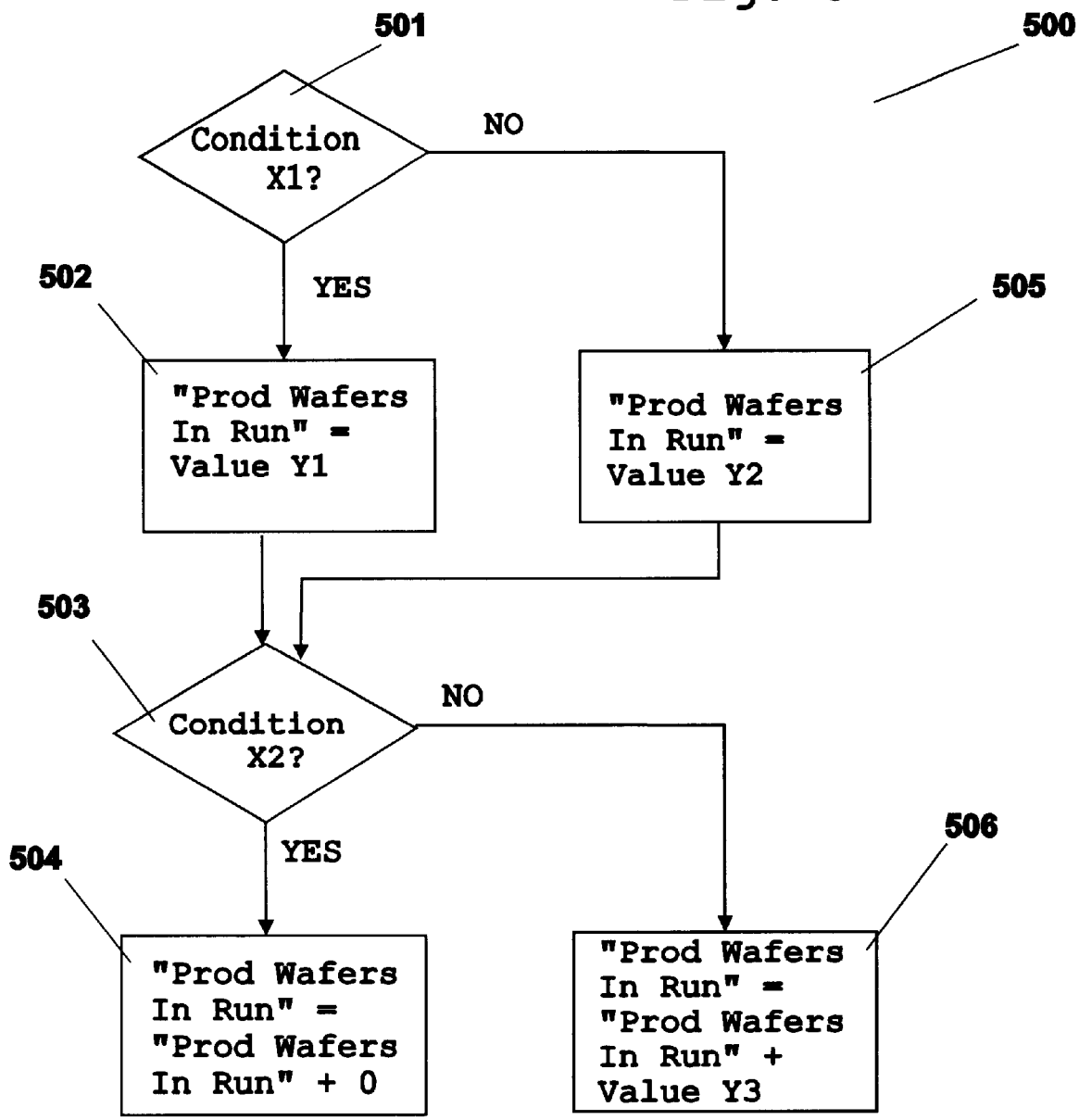
FIG. 5 shows a flow chart of a method of determining the number of finished wafers produced during a run.

FIG. 1 shows an apparatus 100 comprised of an interactive device 102, process specific memory 104, a Time study Group memory (also called average memory) 106, a part specific memory 107, an Experimental What-if memory 108, a first computer processor 110, and a second computer processor 112. The first computer processor 110 may determine frequencies of various subprocesses to be explained, run times of various overall processes, and various what-if outputs for an overall process. The process specific memory 104 is connected to the first computer processor 110 by data busses 104a and 108a. The part specific memory 107 is connected to the first computer processor 110 by data busses 107a and 108a. The average memory 106 is connected to the first computer processor 110 by data busses 106a and 108a. The experimental what-if memory 108 is connected by data bus 108a to computer processor 110. The memories 104, 106, 107, and 108 may actually be portions of a single memory device. The first computer processor 110 is connected to the second computer processor 112 by a data bus 110a. The interactive device 102 is connected to the first computer processor 110 by a data bus 102a. The interactive device 102 may be a mouse or a keyboard or any other known interactive device. The data busses 102a, 104a, 106a, 107a, 108a, and 110a may actually be comprised of ports at both ends and a conductor. For example process specific memory 104 may have an input/output port which is connected to an outputting port, respectively, of the first computer processor 110. The process specific memory 104, average memory 106, the part specific memory 107, experimental what if memory 108, first computer processor 110, and second computer processor 112 may actually be part of a single computer.

The average memory 106 has stored therein average times and average frequencies for a plurality of processes of a similar type called herein a "time study group". In this example the "time study group" can be a group of integrated circuit wafer fabrication processes. In this example each process of the "time study group" group employs one machine. However, further numbers of machines could be employed in a process. In addition, each process is comprised of subprocesses which are performed by this machine and subprocesses which are performed by a human operator.

The process specific memory 104 has stored therein process specific times, frequencies, or other data for certain subprocesses. The process specific memory 104 also has stored therein a Process Dependent Flag, which, if set, indicates that the process specific times or frequencies should be used instead of average values stored in average memory 106 to determine the run time of a particular overall process.

FIG. 2 shows a Table 200 of data which can be stored in the average memory 106 and/or the process specific memory 104 of FIG. 1. The Table 200 shows Subprocess Types in column 202, Subprocess Identifier Numbers in column 204, Process Dependent Flags in column 206, Subprocess Descriptions in column 208, Mean or Average Times (also called Subprocess Times) in column 210, Time Pers (also called indicia of number of products) in column 212, Sublot or Flash Subprocess Volumes in column 214 (also called Subprocess Volumes), Staging Flags in column 216, Butt to Butt Flags in column 218, Labor Required Flags in column 220, Labor Percentage amounts in column 222, Override entry (also called Override Occurrences) in column 226, Parallel Path 1 entry (also called Path 1 Occurrences) in column 228, and Parallel Path 2 entry (also called Path 2 Occurrences) in column 230, Setup ID Name in column 232, and "When" value in column 234.

FIG. 2 shows the subprocesses with identifier numbers 1–25 (in column 204) which are used for a first average overall process. The data in FIG. 2 is all input by an operator. The first average overall process is actually an average of a plurality of overall processes of a group called a "Time Study Group". Each overall process of the "Time Study Group" on average executes all 25 subprocesses shown in FIG. 2 with the average times shown in column 210 in FIG. 2, in the order shown in FIG. 2, and with the average calculated "Frequencies per Run: Normal" shown in column 306 of FIG. 3, to be described later.

Subprocesses are assigned to different Subprocess Types depending on when they are performed in the first average overall process and the amount of machine time they require. The Subprocess Type information shown in column 202 of FIG. 2 is stored in average memory 106 shown in FIG. 1. The data for subprocesses of a certain Subprocess Type can then be summarized by computer processor 110, such as by adding them together, and sent to a planning or scheduling device which requires the data in that format. For example, the average times 210 for subprocesses of the "Transbfr" type (subprocesses numbered 1–4 in column 204) may be added together to get 90 seconds. The "Transbfr" average time of 90 seconds can then be sent from first computer processor 110 to a scheduling or planning program in second computer processor 112 which requires data summarized in this format.

The eleven Subprocess Types currently contemplated are:

(1) Process: A subprocess which occurs during the operation of the particular machine and can be considered the main or most important Subprocess Type. It always consumes machine time.

2) Transbfr: This is an abbreviation for "transaction before". Subprocesses of this type occur before the subprocess "Process". The amount of machine time or capacity consumed depends on the value of the Staging Flag shown in column 216 of FIG. 2 and the estimated Staging Level shown in Table A as well as other input data such as Time Per, number of products, Subprocess Volume which are all entered by a user.

(3) Load: Subprocesses of this type are load activities that occur before the subprocess of type "Process". The amount of machine time or capacity consumed depends on the value of the Staging Flag in column 216 of FIG. 2 and the estimated staging level shown in Table A as well as the other input data such as Time Per, number of products, Subprocess volume which are all entered by a user. The "Time Per" (a/k/a indicia of number of products value in column 212) of FIG. 2 for a "Load" Subprocess Type is usually different from that of the "Transbfr" Subprocess Type.

(4) SETUP: A subprocess used for minor machine setup activities like recipe changes. Recipe changes for integrated circuit wafer fabrication processes would include activities such as changing the temperature at which the process is conducted, a pressure change, or gas concentration change. SETUP subprocesses are performed based on the values of the Setup ID in column 232 of FIG. 2 and in the When Indicator in column 234 in FIG. 2 and the "EST. BATCHES per SETUP", input by a user through interactive device 102 and stored in Experimental What-If Memory 108, see Table A. The "When" value describes whether a SETUP should be done after every batch (always), or only when a recipe changes (need). The "Batches per SETUP" is an estimate of how frequently the SETUP is likely to occur and is input by a user. SETUP subprocesses consume machine time when performed.

(5) Setup1: A subprocess used for major setups like species or target changes. For example, for a wafer fabrication process, this could include the deposition of different type of materials onto the wafer. Setup1 can also be used for part changes which typically require a tool or reticle change. Setup1 subprocesses are performed based on the values of the Setup ID and the "When" value shown in columns 232 and 234 of FIG. 2 and the "EST. Batches per Setup1", input by a user through interactive device 102 and stored in Experimental What-If Memory 108, see Table A. The "When" value describes whether a Setup1 should be done after every batch (always), only when a recipe changes (need) or when a part changes (part). The "Batches per Setup1" is an estimate of how frequently the Setup1 is likely to occur and is input by a user. Setup1 subprocesses consume machine time when performed.

(6) Setup2: A subprocess used for wafer size setup changes that occur on a particular machine. Setup2 subprocesses are performed based on the values of the Wafer Size, stored in Part specific memory 107, See Table E, the "When" value shown in column 234 of FIG. 2 and the "EST. Batches per Setup2" stored in Experimental What-If Memory 108, see Table A at the end of the detailed description. All are input by a user through interactive device 102 and later stored. Setup2 consumes machine time when performed. Although not recommended, Setup2 could also be used as an extra setup activity that occurs for each and every batch ("When" value for Setup2 is set to "always").

(7) FirstPc: A subprocess that occurs during the operation of the particular machine, but only for the first occurrence of a particular overall process. Successive occurrences of identical overall processes do not require a FirstPC subprocess to be repeated. FirstPC subprocesses are repeated if a subprocess of a particular overall process has been interrupted by another subprocess such as SETUP, Setup1, Setup2, an out of work condition or a machine breakdown.

(8) XLoad: Subprocesses of this type are load activities that occur on the machine before the subprocesses of type "Process". XLoad is different from Load in that it always consumes machine time when performed.

(9) XUnload: Subprocesses of this type are unload activities that occur on the machine after the subprocesses of the type "Process". XUnload is different from Unload in that it always consumes machine time when performed.

(10) Unload: Subprocesses of this type are unload activities that occur after the subprocess "Process". The amount of machine time or capacity consumed for an "Unload" subprocess depends on the value of the Staging Flag in column 216 of FIG. 2 and the Estimated "Staging Level" entered by a user and shown in Table A as well as the other input data such as Time Per, number of products, Subprocess volume which are all entered by a user.

(11) Transaft: This is an abbreviation for "transaction after". Subprocesses of this type occur after the subprocess "Process". By definition, they are done away from the machine used to perform the particular overall process and therefore never consume machine time or capacity.

The subprocess identifier number in column 204 in FIG. 2 shows an identifying number for each of the subprocesses. For example the identifier number "7" is shown for the subprocess "load recipe". The column 206 shows a flag indicating whether the particular subprocess is dependent on the overall process that is being executed. For example, the subprocess numbered 4 and called "Measurement" is dependent on the particular overall process that is being executed and therefore there is a "Y" shown under column 206. If the particular subprocess is dependent on the process that is being executed the values for the Subprocess Time in column 210, the Time Per value (or indicia of number of products value) in column 212, the Subprocess Volume in column 214, the Staging Flag in column 216, the BtB Flag in column 218, the Labor Required Flag in column 220, the Labor Percent value in column 222 of FIG. 2, the Override entry value (called "Override" in Table D and FIGS. 8, 9, 10, and 13A) in column 226, the "Path 1 Occurrences" value in column 228 (called "Path1_Occ" in Table D), the "Path 2 Occurrences" value in column 230 in FIG. 2, the Setup ID value in 232 of FIG. 2, and the "When" value in 234 of FIG. 2 may be overridden for a particular overall process. These values may be stored in average memory 106 and may be overridden by values from process specific memory 104.

The column 208 shows Subprocess Descriptions. The column 210 shows a mean or average time for each subprocess in seconds which would be stored in average memory 106 shown in FIG. 1. The column 212 shows an indicia for each subprocess of how many products are processed for the given average time. For example, for the subprocess "Select" in FIG. 2, identified as number "1" has an average time of 20 seconds (shown in column 210) for each "lot" (shown in column 212) that is worked through that subprocess for a plurality of subprocesses for the Time Study Group of this example. A "lot" in this case is 25 semiconductor wafers, which would be entered by a user as the "EST. Lot Size" as shown in Table A, at the end of the detailed description. Table A will be described in detail later in the application.

The "Time Per" value in column 212 may be other than a "lot", for example a sublot or a flash. In the case where the value of "Time Per" in column 212 of FIG. 2 is set to "sublot" then the value of the Subprocess Volume in column 214 is used to describe exactly how many products will be processed in the "sublot". In addition, the "Time Per" value may not always be an indicia of a number of products. A single product may have to undergo the same subprocess many times for a single overall process. If a subprocess has to be executed many times, the "Time Per" value is set to "flash" by an operator through (interactive device 102 and first computer processor 110). The Subprocess Volume is stored in average memory 106 and is used to describe exactly how many "flashes" (or subprocess repetitions) each product will be exposed to prior to the completion of an overall process. Each product in the "lot" will undergo the same number of "flashes" as specified by the Subprocess Volume in column in 214 until all the products in the "lot" have been processed.

The column 216 is a Staging Flag which indicates whether this subprocess can be performed on products from the next overall process (also called STEP ALT) while the machine is busy "processing" or finishing products associated with a prior overall process.

The column 218 in FIG. 2 shows Butt to Butt Flags for each subprocess. If this flag is set to 'Y' it means that the corresponding subprocess is included in butt to butt time calculations. The Butt to Butt Flag is used to identify a subprocess which would still have to be performed while expediting product through a particular overall process in the fastest way possible. For example, subprocesses of the "setup" type (Setup, Setup 1, and Setup 2) are usually not considered part of butt to butt time since most setup type subprocesses could be completed for a machine in anticipation of the product arriving. Subprocess which transfer product to and from storage locations (such as "Transbfr" and "Transaft") would not be part of butt to butt time since the product would be expedited and hand carried to the next overall process skipping intermediate storage locations.

The column 220 in FIG. 2 contains the Labor Required Flags. This flag is set to 'Y' if the corresponding subprocess requires labor (i.e. some action of a human operator). The "Labor %", column 222, shows the percent of time for the particular subprocess which actually requires labor of a human operator if required labor is less than 100%. For example for the subprocess no. 7, "Load Recipe", the percentage labor required under column 222 is 30%. In contrast for the subprocess no. 6, 'Load', the percentage labor required would be 100% (which is not shown) because the Labor Flag is 'Y' in column 220 and the "Labor %" is not indicated and by default would be 100%. When labor is not required such as for subprocess no. 8, 'Wait in cassette for transfer', the labor percentage would be 0% by default.

Columns 226–230 are data entry columns which allow the user to specify the number of times a particular subprocess is performed within a particular Parallel Path 1 or Parallel Path 2 or in an Override condition by inputting such data into process specific memory 104 through interactive device 102 and computer processor 110. In general, for most equipment, it will not be necessary to use the Override or Parallel Path features of one embodiment of the present invention. These fields are only required to characterize the most complicated pieces of equipment.

The Override entry, column 226, can be used to override the "Frequencies Per Run: Normal" calculated by first computer processor 110, stored in average memory 106 and shown in column 306 of FIG. 2.

Parallel Path 1, Column 228, and Parallel Path 2, Column 230, are used to indicate or mark subprocesses that occur in parallel with other subprocesses. Two parallel paths are currently contemplated. The path that has the maximum calculated Time Per Run as shown in column 416 and 418 of FIG. 4 will be included in the throughput calculations shown in Table B at the end of the detailed description. Subprocesses in the lesser path will be excluded. Entries 226, 228, and 230 may be entered in a known manner through interactive device 102 or input from a data file into computer processor 110, and then stored in process specific memory 104.

Referring to FIGS. 2 and 3, the following rules apply equally to both Override Entries shown in column 226 and Parallel Path 1 and 2 Entries shown in columns 228 and 230 as noted:

(1) When the "Time Per" value shown in column 212 of FIG. 2 is equal to batch, lot or sublot then Override, Path1 and Path 2 entries for columns 226, 228, and 230 of FIG. 2 should be entered on a per run basis. A positive value for the Override entry shown in column 226 or a zero will cause the Override entry of column 226 to replace the value shown in "Frequencies Per Run: Normal" of column 306 of FIG. 3. Negative values for the Override entry will subtract or be excluded from the value shown in the "Frequencies Per Run: Normal" of column 306, to form a "Frequencies Per Run: Override" value equal to Normal—Override Entry. The "Frequencies Per Run: Override" value (shown in column 308) will not be allowed to exceed the "Frequencies Per Run: Normal" of column 306 in FIG. 3, even if the Override Entry in column 226 is greater than the "Frequencies Per Run: Normal" value in column 306. Nor will the method allow "Frequencies Per Run: Override" value shown in column 308 to become negative.

(2) When the Subprocess Type shown in column 202 of FIG. 2 is "Process" and the Facility Process Unit ("FPU" as shown in Table A) is "sublot" and indicia of number of products from column 212 in FIG. 2 is "wafer", then entering a positive value for any of the columns 226, 228, or 230 in FIG. 2 will cause wafers equal to the number entered to replace the indicated wafers per sublot (FPU Volume, as shown on second line in Table A), for the purpose of calculating the output values in Table B.

Negative values in columns 226, 228, or 230 have a similar effect, causing wafers equal to the number entered to be excluded from each sublot.

(3) When the "Time Per" from column 212 in FIG. 2 is "wafer" and the FPU from Table A is not "sublot", then entering a positive value in columns 226, 228, or 230 will cause wafers equal to the number entered to replace the indicated wafers per batch in Table A. Negative values have a similar effect, causing wafers equal to the number entered to be excluded from the calculations. These values are used in the calculation of outputs such as run times as shown in Table B or in Table 400 of FIG. 4.

(4) When the "Time Per" value shown in column 212 is "flash" entering a positive value for the values shown in columns 226, 228, or 230 will replace the indicated FPU Volume in Table A for the purposes of calculating the run times in Table 400 of FIG. 4. Negative values will cause flashes equal to the number entered to be excluded from each wafer.

(5) Entering a '999' value into the computer processor 110 for the data of the type shown in columns 226, 228 or 230 has the effect of transferring all the "Frequencies Per Run: Normal" in column 306 of FIG. 3 to the indicated Override path column 308 or Parallel Path 1 or 2 columns 310 and 312.

(6) Fractional values are allowed for entry values shown in columns 226, 228, and 230. For example, an Override entry value of 0.5 in column 226 would indicate a subprocess that is done every other batch.

Figure 9:
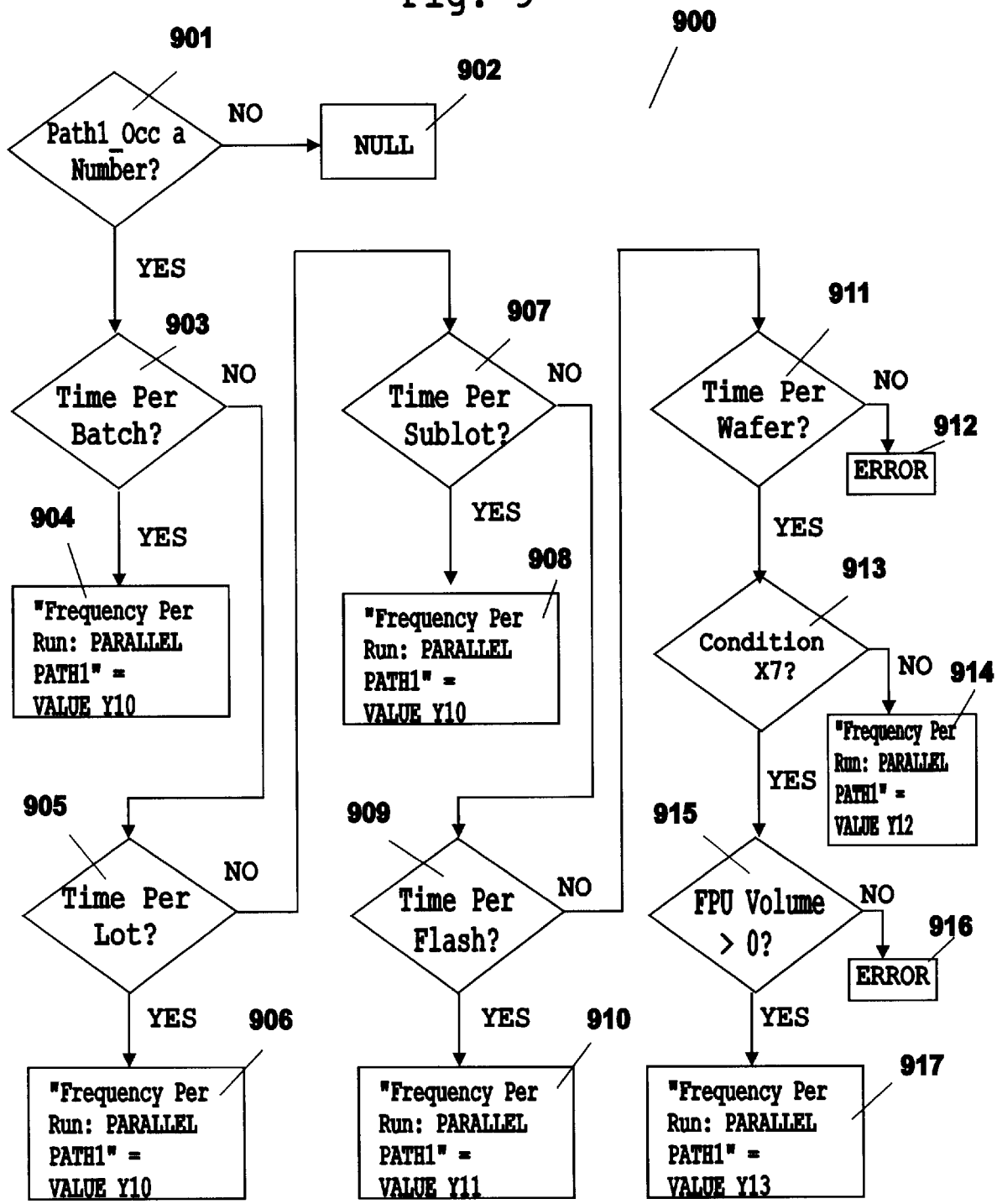
FIG. 9 shows a flow chart of a method of determining the parallel path 1 frequency per run of a particular subprocess.
Figure 10:
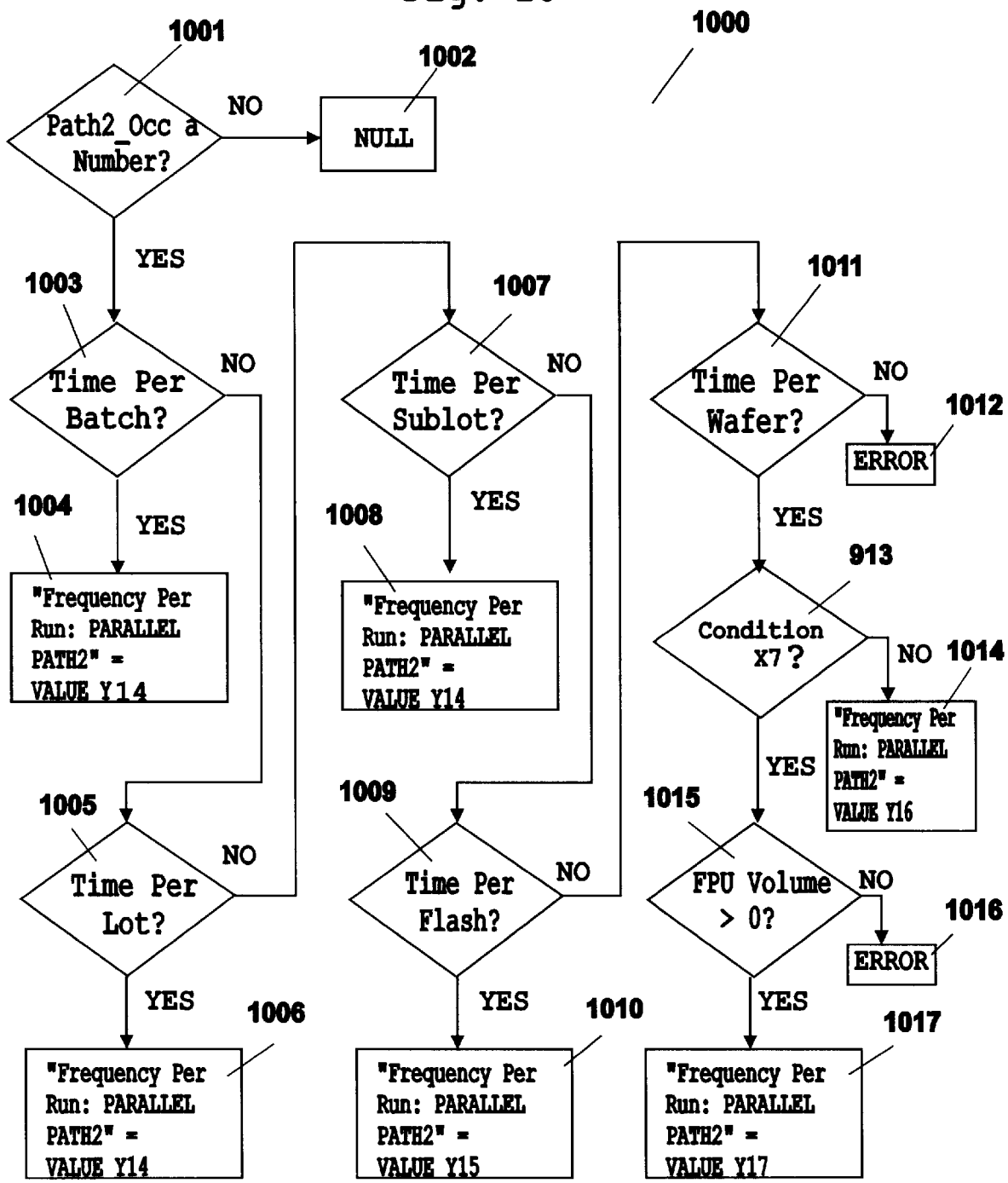
FIG. 10 shows a flow chart of a method of determining the parallel path 2 frequency per run of a particular subprocess.

(7) Parallel Path 1 or 2 Frequency values shown in columns 310 and 312 in FIG. 3 will be calculated from residual frequencies, as shown in flow chart in FIGS. 9 and 10, after consideration has been given to the Override values of column 308. Any residual frequencies remaining after the Parallel Path Frequencies Per Run values in columns 310 and 312 have been calculated will be included in the "Combined Frequency" calculation of column 318 in FIG. 3 unless a zero Override value in column 226 is entered.

Column 232 is the Setup ID Name and is a particular identification or name associated with the process specific setup subprocesses (SETUP, Setup1, and/or Setup2). It is assigned by an operator inputting such data into process specific memory 104 through interactive device 102 and computer processor 110.

The "When" value, column 234, stores an indicia of how frequently the setup operations are performed. If the "When" value is set to "need" then a setup operation will be performed every time the Setup ID Name changes for a particular set of processes performed sequentially. Similarly, if the value is set to "part" setup operations will be performed each time a PART changes for a particular series of processes. If the "When" value is set to "always" then the setup operation will be performed every time a process is performed.

FIG. 3 shows a Table 300 of data which would be stored in process specific memory 104 or average memory 106 of FIG. 1. Table 300 includes subprocess identifier number column 302 and subprocess description column 304 which are analogous to columns 204 and 208 of Table 200 of FIG. 2. The Table 300 also includes "Frequencies per Run: Normal" column 306, calculated "Frequencies per Run: Override" column 308, "Frequencies per Run: Path 1" column 310, and "Frequencies per Run: Path" column 312, Setup Multiplier column 314, Stage or Cascade Divisor column 316, and Combined Frequency column 318.

The Normal Frequency column 306 in FIG. 3 shows the number of repetitions of the particular subprocess required to process a certain number of products in the normal average non-override case. For example, repeating the-subprocess no. 9, "First transfer from cassette to elevator" 25 times allows the appropriate number of products to be processed by that subprocess for the first average overall process. In this case 25 repetitions of the subprocess no. 9 would process 25 wafers. The other repetitions for the other subprocesses in column 306 are also for processing 25 wafers, which in this case is both the lot size and the batch size. Subprocesses no. 1 through 8, 10, 19, and 21–25 are each performed only once in order to process 25 wafers. Subprocesses 9, 11, 13–16, 18, and 20 are repeated twenty-five times to process 25 wafers. Subprocesses 12 and 17 are repeated five times to process 25 wafers. These repetition numbers are average numbers which are typically used for a plurality of different overall processes which are part of a time study group. The number of repetitions of the subprocess in column 306 may change for a specific overall process. Thus one overall process within a time study group may perform a subprocess such as subprocess no. 13, twenty-five times (which is the most likely as shown in column 306), while another process within a time study group may perform subprocess numbered 13, ten times. Thus the overall time that subprocess no. 13 is performed may differ from one overall process to the next.

The variable "Frequency Per Run: Normal" is determined based on the following input values: (1) Average Time shown in column 210 of FIG. 2, (2) Time Per value in column 212 of FIG. 2, (3) Subprocess Type in column 202 of FIG. 2, (4) FPU Volume from Table A stored in experimental what if memory 108 (5) Subprocess Volume in column 214 of FIG. 2, and (6) EST. Lot Size. These are all entered by a user through interactive device 102 and computer processor 110, into one of memories 104, 106, or 108. "Frequency Per Run: Normal" is also determined based on the value of "Prod Wafers in Run" and "Dummy Wafers in Run" calculated by the methods of flow charts 500 and 600 of FIGS. 5 and 6, based on the value of the FPU. Facility Process Unit, (4) Facility Process Unit Volume and (6) Est. Lot Size will be described later.

Figure 7A:
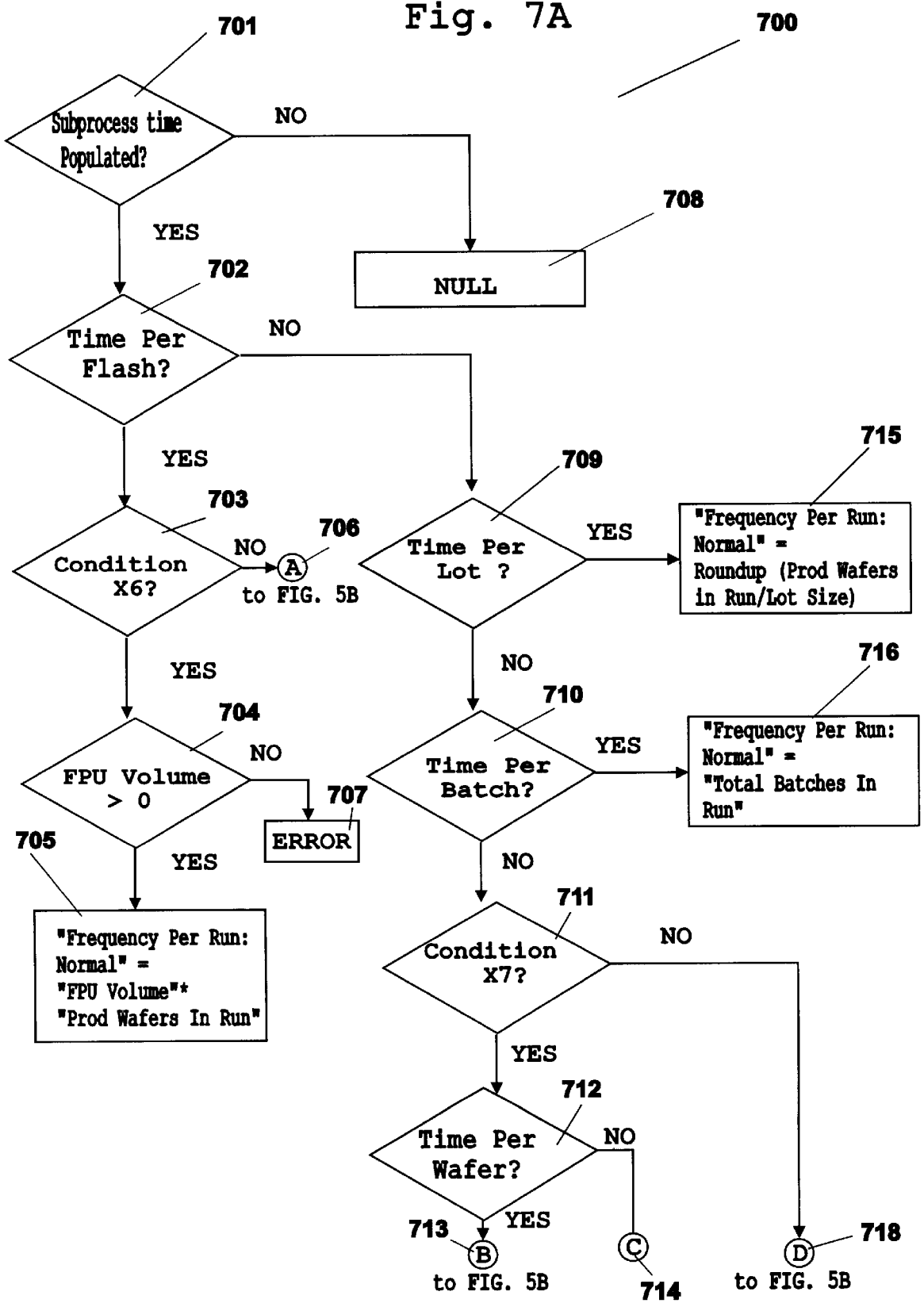
FIGS. 7A and 7B show a flow chart of a method of determining the Normal Frequency per run of a particular subprocess.
Figure 7B:
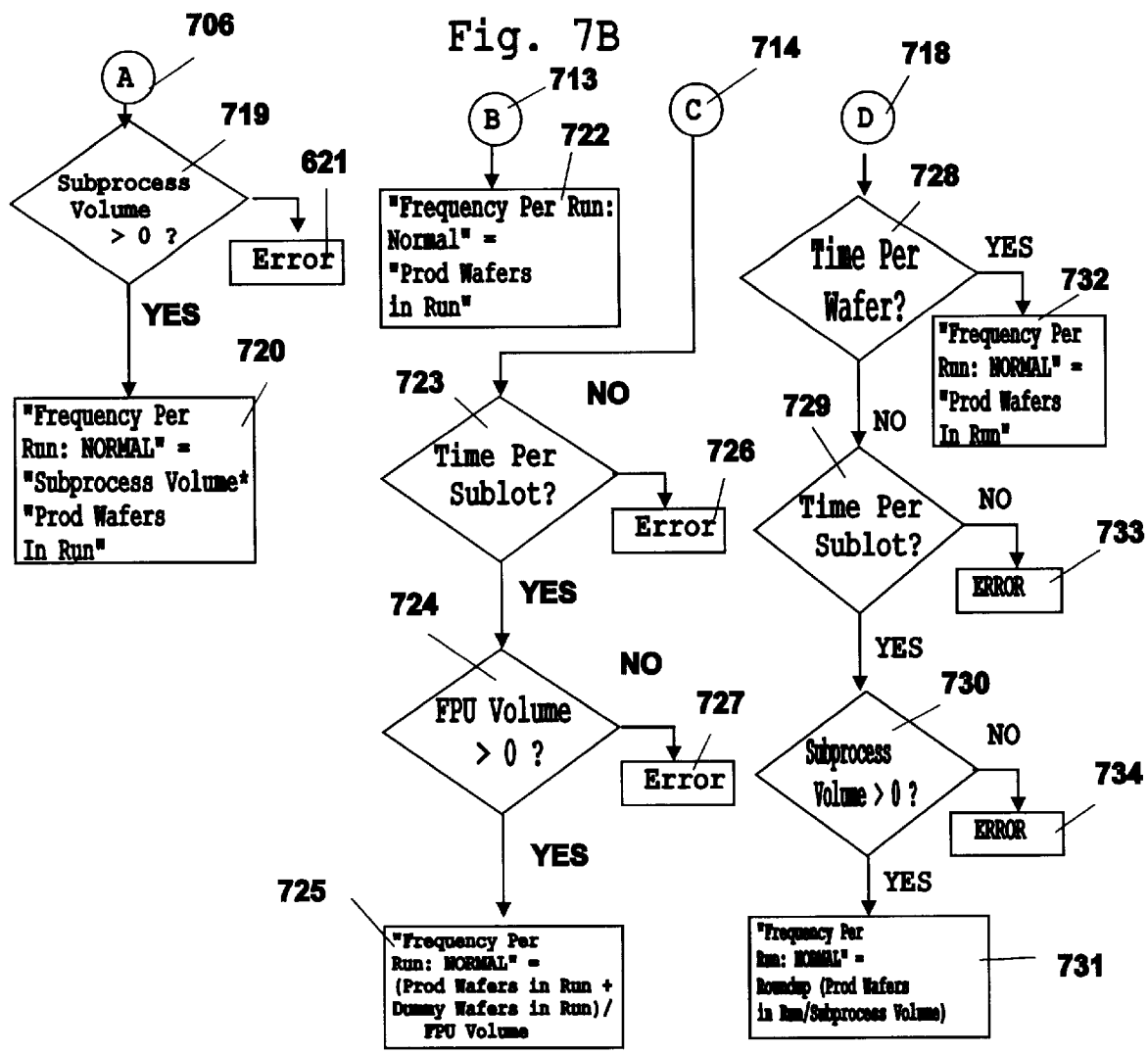

The variable "Frequency Per Run: Normal" as shown by FIGS. 7A–B, will be set to one of eight different values or a null operation will be performed. A null operation is performed at step 708 when it is determined that the Subprocess Time is not populated. This means that the particular subprocess is not performed at all during the overall process for the particular machine. "Frequency Per Run: Normal" is set to "FPU Volume"*"Prod Wafers In Run" at step 705 if the "Time Per" is flash, as determined at step 702, condition X6 is fulfilled, at step 703 (meaning that the Facility Process Unit is "flash" and the Subprocess Type is "Process"), and the FPU volume is greater than zero as determined at step 704. "Frequency Per Run: Normal" is set to Roundup(Prod Wafers in Run/Lot Size) at step 715 if the Subprocess Time is populated at step 701 and the "Time Per" is "Lot" as determined by steps 702 and 709. "Frequency Per Run: Normal" is set to "Total Batches in Run" at step 716 if the "Subprocess Time" is populated and the "Time Per" is "batch" as determined by steps 702, 709, and 710. "Frequency Per Run: Normal" is set to "Subprocess Volume"*"Prod Wafers In Run" at step 720 if the Subprocess Time is populated at step 701, condition X6 is not fulfilled at step 703, (either Time Per does not equal "flash" or Subprocess Type does not equal "Process"), and the "Subprocess Volume" is greater than zero. "Frequency Per Run: Normal" is set to "Prod Wafers In Run" at step 722 if "Subprocess Time" is populated at step 701, if the "Time Per" is "wafer" as determined by steps 702, 709, 710, and 712 and condition X7 is fulfilled at step 711 (meaning both "Facility Process Unit"="sublot" and Subprocess Type= "Process").

"Frequency Per Run: Normal" is set to (Prod Wafers in Run+Dummy Wafers in Run)/FPU Volume" at step 725 if the "Subprocess Time" is populated at step 601, the "Time Per" is "sublot" as determined by steps 702, 709, 710, 712, and 723, condition X7 is fulfilled at step 711 (meaning both "Facility Process Unit"="sublot" and "Subprocess Type" is "process"), and the FPU Volume is greater than zero at step 724. "Frequency Per Run: Normal" is set to "Prod Wafers In Run" at step 732 if the "Subprocess Time" is populated at step 601, the "Time per" is "wafer" as determined by steps 702, 709, 710, 728, and condition X7 is not fulfilled at step 711. "Frequency Per Run: Normal" is set to "Roundup (Prod Wafers in Run/Subprocess Volume) at step 731, if the "Subprocess Time" is populated at step 701, the "Time per" is "sublot" as determined by steps 702, 709, 710, 728, and 729, condition X7 is not fulfilled at step 711, and the "Subprocess Volume" is greater than zero at step 730.

Figure 8:
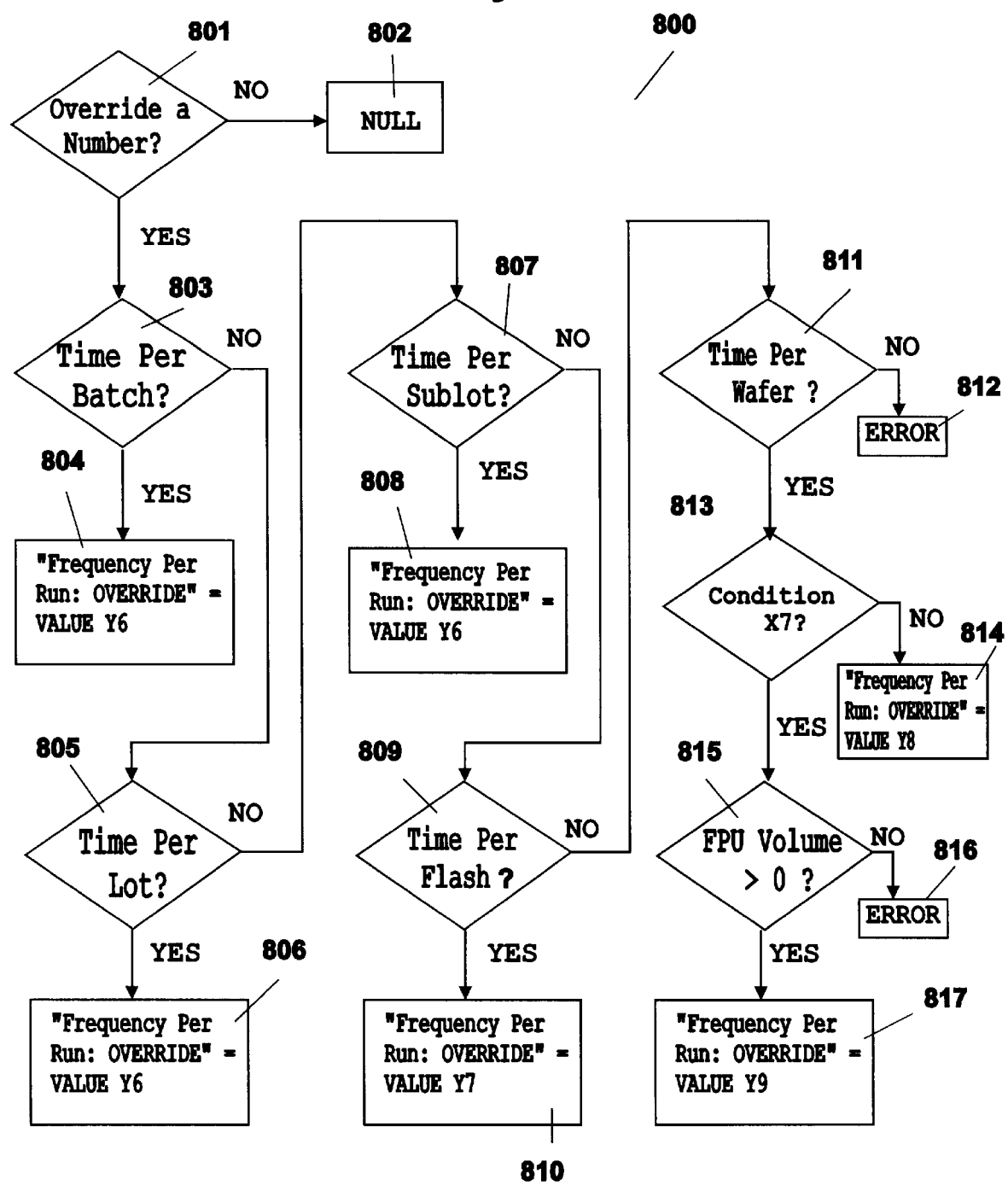
FIG. 8 shows a flow chart of a method of determining the Override Frequency per run of a particular subprocess.

Column 308 of FIG. 3 is the result of using the method shown in FIG. 8 for determining the Override Frequency (also called "Frequency Per Run: Override"). Columns 310 and 312 of FIG. 3 are the results of using the methods shown in FIGS. 9 and 10 respectively for determining the Path 1 and Path 2 Frequencies (also called "Frequency Per Run: Parallel Path 1" and "Frequency Per Run: Parallel Path 2").

These frequencies are based in part on user entered values from columns 226, 228, and 230.

FIGS. 8, 9, and 10 show flow charts 800, 900, and 1000. The flow charts show methods by which computer processor 110 can determine the "Frequency Per Run: Override", "Frequency Per Run: Parallel Path 1", and "Frequency Per Run: Parallel Path2" and store these values in process specific memory 104. The flow charts are identical except as to the values that the various variables are set (i.e. the "Y" Values shown in Table D). The operation of the method shown in FIG. 8 will be described. The methods shown in FIGS. 9 and 10 are analogous.

The "Frequency Per Run: Override" shown in FIG. 3 column 308 is the calculated number of repetitions that a subprocess is performed based on an override value that is entered into first computer processor 110 an shown in column 226 of FIG. 2 by a human operator or through a data file. Essentially the method shown in FIG. 8 takes an override value of the "Time Per" (i.e. indicia of the number of products on which the average time of FIG. 2 column 210 is based); determines whether the "Time Per" is (1) a batch (2) a lot (3) a sublot (4) a flash, or (5) a wafer, and then calculates the "Frequency Per Run: Override" based on the override "Time Per". For a batch, lot, and a sublot the "Frequency Per Run: Override" is set in a similar manner at steps 804, 806, and 808. For a "Time Per" value of "batch", "lot", or sublot", the "Frequency Per Run: Override" is set to Y6, where Y6 is shown in Table D. Y6 is based on the "Override" value input by the user and the Normal Frequency value, also called "Frequency Per Run:Normal". For the "flash" case, "Frequency Per Run: Override" is set at step 810 to value Y7. Value Y7 is based on the "Override", "Normal Frequency", and "Prod Wafers in Run". For the wafer case, the "Frequency Per Run: Override" variable can be set to Y8 at step 814 (based on "Override", "Normal Frequency", and "Batches Per Run"), or Y9 at step 817 (based on "Override", "Normal Frequency", and "Prod Wafers in Run"). If certain expected conditions are not satisfied an error may appear.

Figure 11:
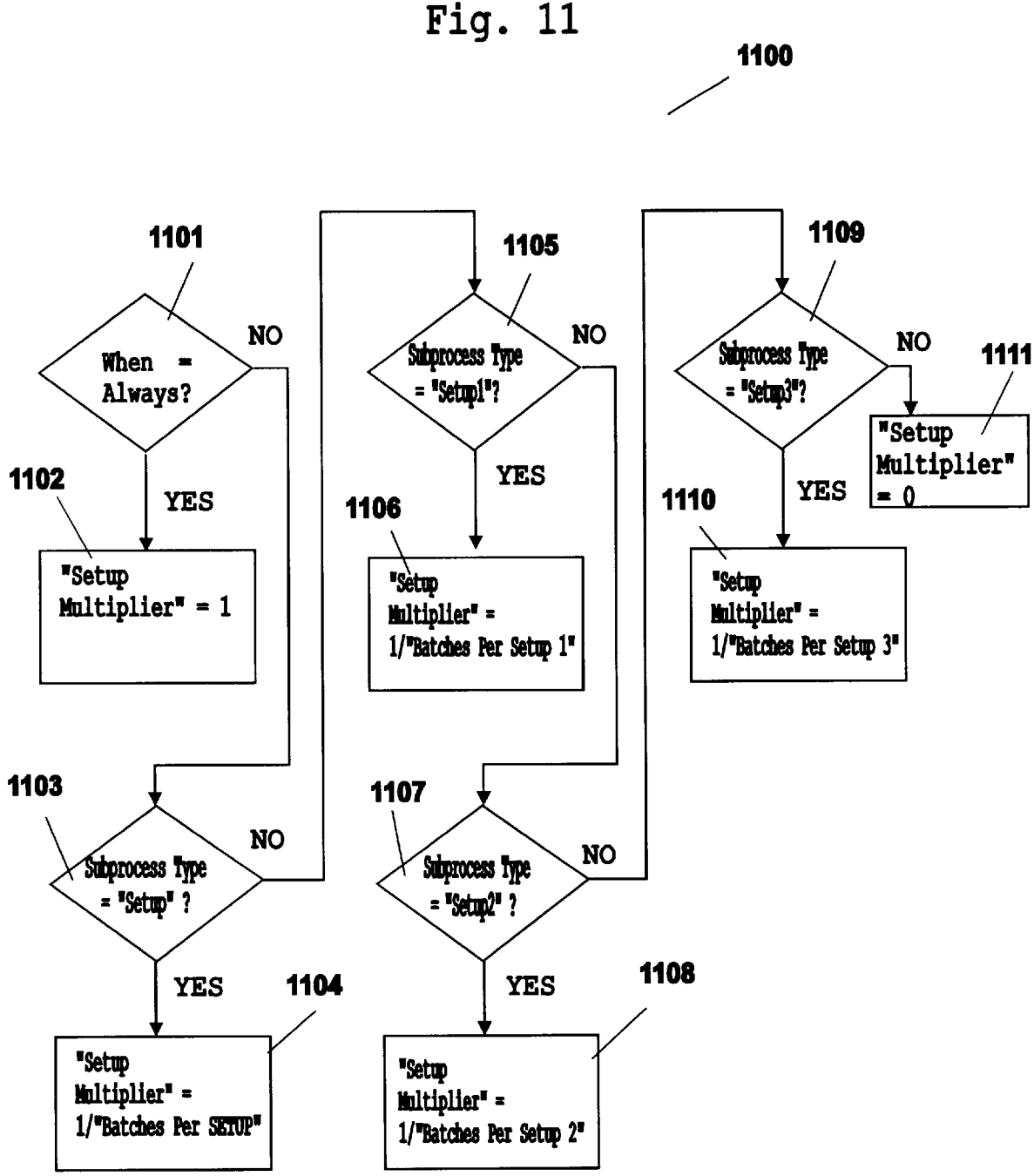
FIG. 11 shows a flow chart of a method of determining the Setup Multiplier of a particular subprocess.

FIG. 11 shows a flow chart 1100 of a method of determining a Setup Multiplier. The variable Setup Multiplier (in column 314 of FIG. 3) is the average number of setups that are performed in the Run, given the "Batches per Setup" entered as an input value by an operator or from a data file. The Setup Multiplier is either set to 1 at step 1102, set to 0 at step 1111 or set to the reciprocal of "Batches per SETUP", "Batches per Setup1", "Batches per Setup2", or "Batches per Setup3", at steps 1104, 1106,1108 or 1110 respectively. The four "Batches per Setup" quantities are input values from a human operator or a data file. The Setup Multiplier is determined on a per subprocess basis.

FIG. 12 shows a flow chart 1200 for determining the "Stage Cascade Divisor" (This is shown in column 316 of FIG. 3). This is a divisor which is calculated given the estimated Staging and Cascading Levels entered as input values. A subprocess can be staged or cascaded but not both. In FIG. 12, the "Stage Cascade Divisor" will be set equal to 0 at step 1205, Y18 (which is based on "Staging Level", Override Frequency", "Path 1 Frequency", "Path 2 Frequency", and the "Normal Frequency") at step 1202, or "Normal Frequency"/Y19/Batches in Run/Cascade Level at step 1204. Y19 depends on whether the subprocess Time Per is a "batch", "lot", "sublot", "wafer" or a "flash". For a "batch" Y19 will be the "1". For a "lot" Y19 will be "Lots in Batch". For a "wafer" Y19 will be "Batch Size". For a "flash" Y19 will be "Subprocess Volume". For a "sublot" Y19 will be "Batch Size"/"Subprocess Volume".

Figure 13A:
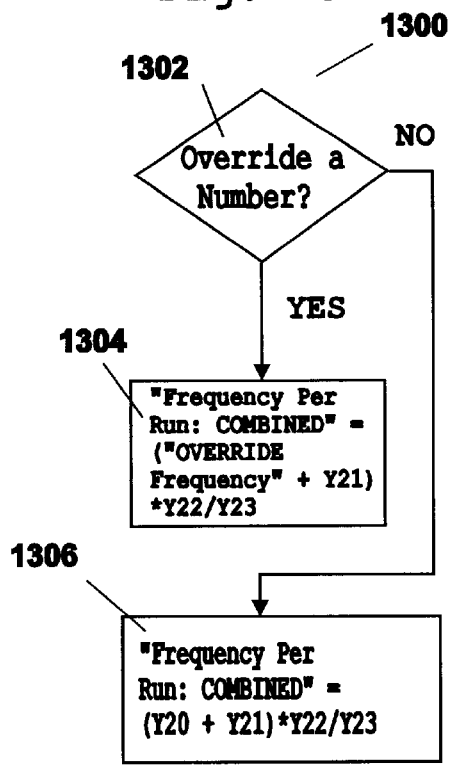
FIG. 13A shows a flow chart of a method of determining the combined frequency per run of a particular subprocess.

FIG. 13A shows flow chart 1300 for determining "Frequency Per Run: Combined" shown in column 318 of FIG. 3. In FIG. 13A, the "Frequency Per Run: Combined" will be set to the ("Override Frequency"+Y21)*Y22/Y23 at step 1304 or the values (Y20+Y21)*Y22/Y23 at step 1306. The values Y20, Y21, Y22, and Y23 are based on "Normal Frequency", "Path 1 Frequency", "Path 2 Frequency", "Path 1 Total Time", "Path 2 Total Time", the Setup Multiplier and the "Stage Cascade Divisor".

FIG. 4 shows a further Table 400 of data calculated by computer processor 110, which can be stored in both process specific memory 104 and average memory 106. Table 400 shows subprocess identifier numbers in column 402 and subprocess descriptions in column 404 which are analogous to the data in columns 204 and 208 of Table 200. Table 400 of FIG. 4 shows under the heading "Times (in sec) Per Run" columns named "BtB" 406, "Machine" 408, "Lot Interval" 410, "Labor" 412, "Theor" 414, which stands for theoretical, and under the heading "parallel calculations" there are columns "Path 1" 416 and "Path2" 418. Columns 406, 408, 410, 412, 414, 416, and 418 show various times which can be calculated for a specific overall process or for an average overall process. All the columns show no time for the subprocess no. 9, since the override value is zero and thus no time is spent for subprocess no. 9. At the bottom of the Table 400 in the last row next to "TOTALS" are the total run times for all 25 subprocesses in an overall specific process or an overall average process.

The times for all of the subprocesses for columns 406–418 shown in FIG. 4 will be added up to determine the run times shown in Table B. Many of the above times may all be considered run times in accordance with the present invention (such as "Calc. Machine Total Time Per Run"). An average time shown in column 210 of FIG. 2 can be replaced by process specific times supplied by a user in order to determine the new run times and to determine the impact of a slower or faster subprocess.

Figure 13B:
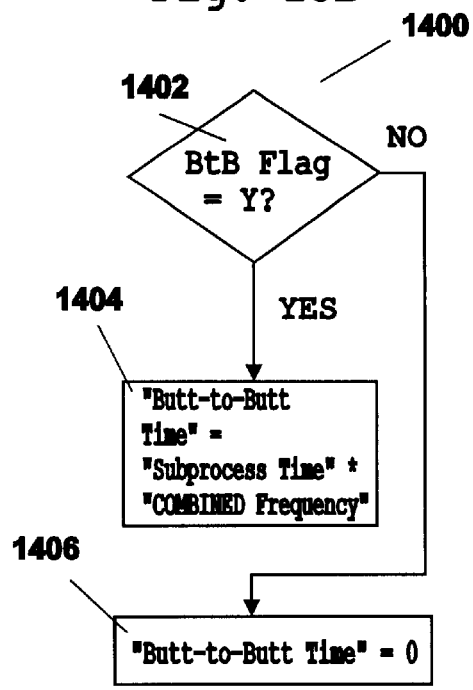
FIG. 13B shows a flow chart of a method of determining the Butt to Butt Time contribution of a particular subprocess.
Figure 13C:
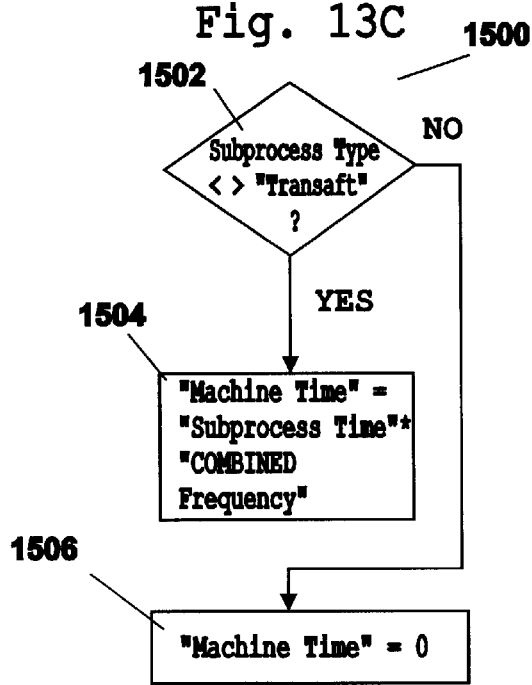
FIG. 13C shows a flow chart of a method of determining the Machine Time contribution of a particular subprocess.
Figure 13D:
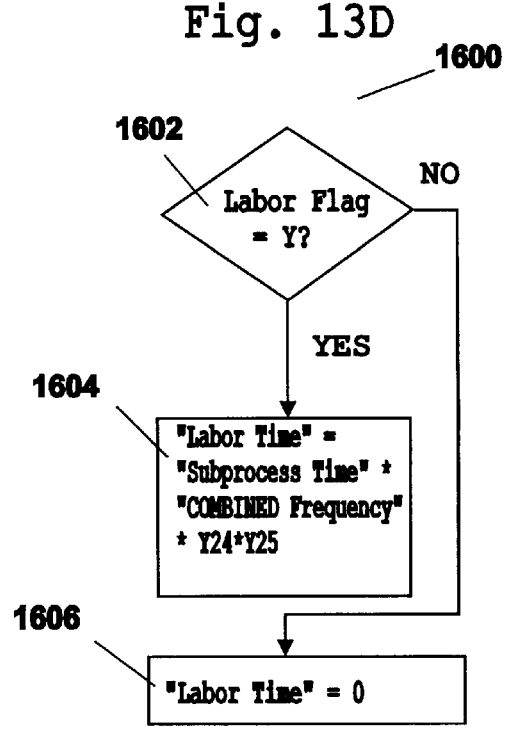
FIG. 13D shows a flow chart of a method of determining the Labor Time contribution of a particular subprocess.

FIGS. 13B–D show flow charts 1400, 1500, and 1600 for "Butt-to-Butt Time" (column 406 of FIG. 4), "Machine Time" (column 408), and "Labor Time" (column 412), of each subprocess respectively. FIGS. 14A–14D shows flow charts 1700,1800,1900, and 2000 of methods in accordance with the present invention for setting "Theoretical Time", "Path 1 Time", "Path 2 Time", and "Lot Interval Time" for each subprocess, respectively which are shown in columns 414,416, 418, and 410 of FIG. 4. Each one of the methods shown in the flow charts is done on a per subprocess basis.

In FIG. 13B, the "Butt-to-Butt Time" for a subprocess will equal the "Subprocess Time" (also called average time shown in FIG. 2 column 210)*"Combined Frequency" if the "BTB Flag" is "Y", otherwise the "Butt-to-Butt Time" will equal zero. Similarly, in FIG. 13C, the "Machine Time" for a subprocess will equal the "Subprocess Time" (shown in FIG. 2 column 210)*"Combined Frequency" if the "Subprocess Type" is not equal to "Transaft" (meaning this is not a subprocess which occurs after the main process), otherwise the "Machine Time" will be set to zero. In FIG. 13D, the "Labor Time" will be set to "Subprocess Time"*"Combined Frequency"*Y24*Y25 at step 1604 or to 0 at step 1606. The value Y24 is a percentage of the subprocess time that includes labor and may range from 100% to 0%. The value Y25 is the Stage Cascade Divisor or 1.

Figure 14A:
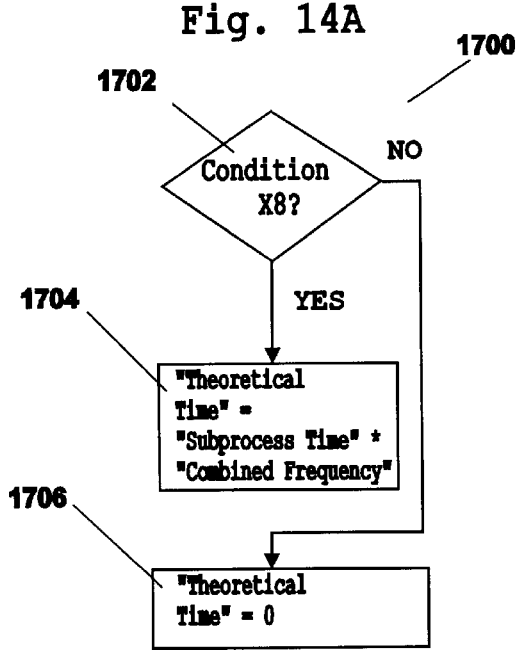
FIGS. 14A–D show flow charts for methods of determining Theoretical Time, Path 1 Time, and Path 2 Time, respectively of a particular subprocess.
Figure 14B:
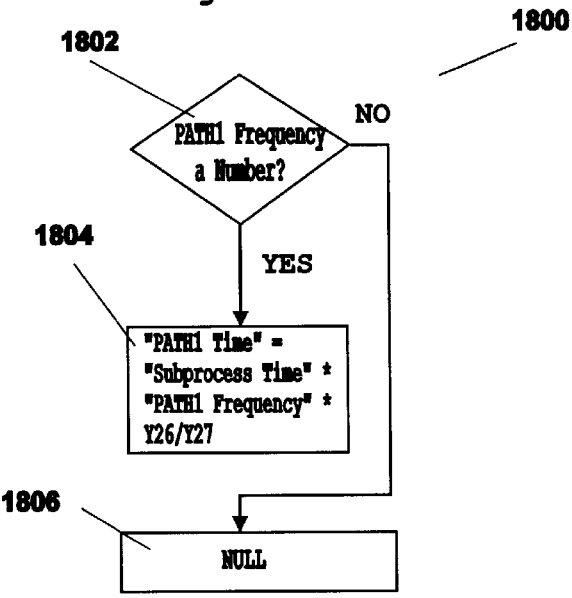

In FIG. 14A, the "Theoretical Time" will be set to "Subprocess Time"*"Combined Frequency" at step 1704 or to 0 at step 1706. In FIG. 14B, the "Path 1 Time" will be set to "Subprocess Time"*"Path 1 Frequency"*Y26N27 at step

Figure 14C:
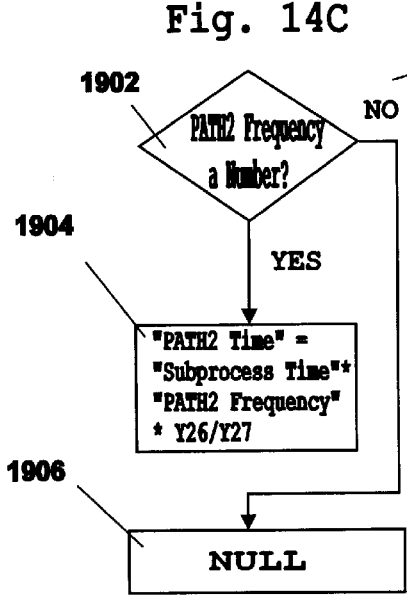
Figure 14D:
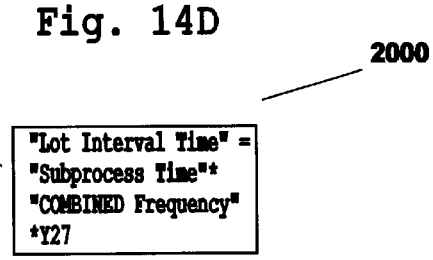

1804 if the "Path 1 Frequency" is a number" as determined at step 1802, or a null operation is performed at step 1806. Y26 is either the Setup Multiplier or 1. Y27 is either the "Stage Cascade Divisor" or 1. In FIG. 14C the "Path2 Time" will be set to "Subprocess Time"*"Path 2 Frequency"*Y26NY27 at step 1904 if the "Path 2 Frequency" is a number as determined at step 1902 or a null operation is performed at step 1906. In FIG. 14D the "Lot Interval Time" will be set to "Subprocess Time"*"Combined Frequency"*Y27 at step 2002. Y27 is equal to the Stage Cascade Divisor if the Stage Cascade Divisor is greater than zero. Y27 is equal to 1 if the Stage Cascade Divisor is not greater than zero.

The values in Experimental What-If Memory, see Table A, having a title starting with "EST." (estimated) are all values input by a user through interactive device 102 and computer processor 110 and stored in process specific memory 104 or average memory 106. The values adjacent the title "CALC." and the Facility Process Unit are calculated by the first computer processor 110.

The Facility Process Unit ("FPU") is calculated by first computer processor 110. The Facility Process Unit is the unit (such as batch, lot, sublot, wafer or flash) which best describes the manner in which the primary facility (or main machine executing a process) processes work. The facility or main machine is considered to be processing work during those subprocesses where the Subprocess Type is equal to "process". The Facility Process Unit may be a lot, a sublot, a batch, or any other number of wafers. It also may be a section of a wafer such as a number of chips on a wafer. The processor 110 can assign the FPU using the following method:

(1) Isolate the subprocesses with the Subprocess Type= "process".

(2) For the subset of subprocesses from above, sum the Machine Times Per Run for each of the different Time Per's (batch, lot, sublot, wafer, or flash) (For example referring to FIG. 2, for subprocesses numbered 11, 13–16 and 18, add up these subprocess Machine Times, since they have a Time Per in column 212 of wafer. Then add up the machine times of subprocesses numbered 12 and 17 since they have a Time Per in column 212 of sublot.)

(3) Set the FPU equal to the Time Per with the largest summed value.

(4) If the FPU is wafer and the FPU Volume is greater than 1 then the FPU will change to be sublot.

The facility process unit may be some number of products such as a "lot" or a "batch", which may both represent for example 25 products.

The FPU Volume stands for Facility Process Unit Volume and is the number of work units contained within a facility process unit. For all FPU's except sublot and flash, the FPU Volume, by definition, is set equal to one. For example a FPU of batch has an FPU Volume of one batch. One batch is completed each time the facility processes one batch. FPU Volume takes on a more meaningful role when trying to describe sublot and flash processes. Here we need to know how many products (such as wafers in this example) are processed in each sublot so we can calculate how many sublots must be processed to finish the run. Similarly, we need to know the total number of flash processes that will be completed for each product. The FPU Volume value contains this information in Experimental What If Memory 108 of FIG. 1.

EST. Batch Size, where "EST." stands for estimated, is entered by a user and shown in Table A. For this example, it is defined as the total number of wafers that are combined and loaded onto the particular machine or facility running the particular process. The particular facility does not necessarily process the entire batch at once, however a batch is physically all loaded at once onto the machine. A "batch" differs from "lot" in that the batch may come from more than one or less than one identifiable lot number(s).

"EST. Lot Size", is entered by a user, and for this example, is the total number of wafers that make up a traceable entity as defined in the manufacturing execution systems. For example, a total of twenty-five wafers may be identified under a designated lot number of "001" and may be tracked and traced by that lot number.

"CALC. Lots in Batch", where "CALC" stands for calculated, is determined based on the "EST. Batch Size" divided by the "EST. Lot Size".

"EST. Staging Level", is input by an operator and shown in Table A. Staging Level is defined as follows. While the primary facility or machine is processing the first batch, an operator will perform all the staging activities for the next batch. To the extent that he can do this for these two batches (the one in the machine plus the one being staged) before the machine finishes processing the first batch, the staging level is set at two (2) by an operator input into computer processor 110 through interactive device 102 and stored in experimental what ifs memory 108. If an operator can stage a third batch while the machine is processing prior batches then the staging level would be set to three (3). The staging level is an indication of how may times an operator can repeat this pattern until a next batch is no longer staged and the machine runs out of work (perhaps the operator is at lunch or tending to another machine).

"EST. Cascade Level" is input by an operator (through interactive device 102 and first computer processor 110) and is shown in Table A. Cascade Level is defined as follows. While the primary facility or machine is processing the first batch, the next batch will be cascaded into position for processing. To the extent that this can be done within the machine for these two batches (the one in the machine plus the one being cascaded) the cascading level is set to (2) by an operator. If a third batch can be loaded into position for processing by the machine while the machine is processing prior batches then the cascading level would be set to three (3) by an operator. The cascading level then is an indicia of how may times the machine is able to repeat this pattern until a next batch is no longer cascaded into position and the machine runs out of work. Setup changes and breakdowns also prevent the next lot from being moved into the processing position and thereby interrupt the cascading sequence.

"CALC. Prod Wafers in Run" in Table A represents the number of finished wafers produced during a run and is determined by processor 110 by the method of the flow chart 500 in FIG. 5. "CALC Prod Wafers in Run" is determined based on the following input values provided by a human operator or from a data file: (1) EST. Lot Size, (2) EST. Batch Size, (3) EST. Staging Level, and (4) EST. Cascade Level.

The variable "Prod Wafers in Run" will be set to either: Y1, Y2, Y1+Y3 or Y2+Y3. The values Y1 through Y35 are shown in Table D at the end of this detailed description section. In FIG. 5, the variable "Prod Wafers in Run" is set to Y1 at steps 502 and 504 when condition X1 is fulfilled at step 501 and condition X2 is fulfilled at step 503. Conditions X1 through X11 are shown in Table C at the end of this detailed description section. The variable "Prod Wafers in Run" is set to Y2 at steps 505 and 504 when condition X1 is not fulfilled and condition X2 is fulfilled. The variable "Prod Wafers in Run" is set to Y1+Y3 at steps 502 and 506 when condition X1 is fulfilled and condition X2 is not fulfilled. The variable "Prod Wafers in Run" is set to Y2+Y3 at steps 505 and 506 when condition X1 is not fulfilled and condition X2 is not fulfilled.

"Productive Wafers in Run" is a calculation based on how much product is actually introduced to the manufacturing floor at one time (lot size), how much product is loaded on the machine at one time (batch size), how efficient the operator is at preparing subsequent batches to be run on the machine (staging level) and how efficient the machine is at being able to keep itself loaded (cascading level). Batches can be made up of product from the same lot (batch<lot size) or can be made up of more than one lot (batch>lot size) or can be the same as a lot (batch=lot size). Since a machine can be kept loaded or staged with product from different lots or batches the run size can be larger than either the batch size or the lot size. The run size ultimately depends on how much product is available for a particular type of process or setup and how efficient the operator is at keeping the machine loaded. At some point the machine will need to be setup or repaired and the run will be completed.

The equations for productive wafers per run as well as all the other equations in the application were determined through observation, careful analysis and the application of heuristic techniques. The results of the formulas were then compared to the actual machine studies made on the shop floor and adjustments were made to the equations where it was deemed necessary.

"CALC. Dummy Wafers in Run" in Table A is determined by processor 110 by the method of the flow chart in FIG. 6. Some sublot facilities need to process the same number of products or wafers for each successive cycle of the machine or product quality will not be maintained. In these cases, dummy wafers are used to "fill-out" the process tray and maintain a consistent number of products for each sublot process. For example, if a facility processes wafers in sublots of 10 and the lot size is only 25 wafers then 5 dummy wafers will be required to "fill-out" the third sublot tray. These dummy wafers are not counted in production (they are not productive wafers) and they do not count towards the machine rate. However they do consume machine capacity and need to be accounted for in the overall amount of time it takes to process the batch or lot.

Figure 6:
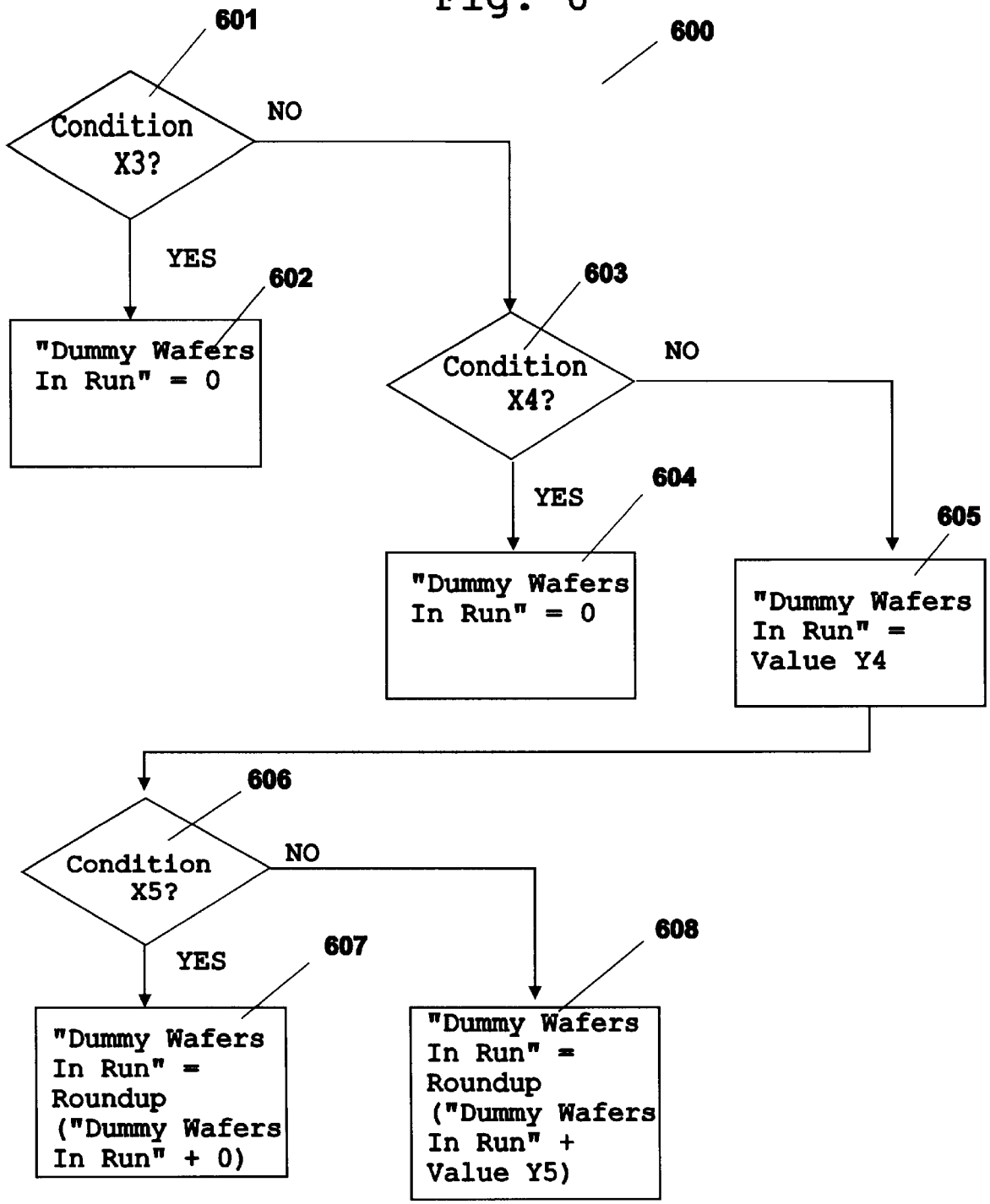
FIG. 6 shows a flow chart of a method of determining the number of dummy wafers needed for a run.

FIG. 6 shows a flow chart 600 of a method of determining the dummy wafers needed in a run called "Dummy Wafers in Run". "Dummy Wafers in Run" is determined based on the following input values provided by a human operator or from a data file: (1) EST. Lot Size, (2) EST. Batch Size, (3) EST Staging Level, (4) EST. Cascading Level, (5) Facility Process Unit, and (6) FPU Volume, all shown in Table A. "Dummy Wafers in Run" is also determined based on the value of "CALC Prod Wafers in Run" calculated by the method of flow chart 500 of FIG. 5.

The variable "Dummy Wafers in Run" as shown by FIG. 6, will be set to either: 0, Y4, or Y4+Y5. The values Y4 and Y5 are shown in Table D. The variable "Dummy Wafers in Run" is set to 0, at steps 602 or 604 when conditions X3, at step 601 or condition X4, at step 603 in FIG. 6 are fulfilled. Conditions X1–X11 are shown in Table C. The variable "Dummy Wafers in Run" is set to Y4 at steps 605 and 607, when conditions X3 and X4 are not fulfilled and condition X5 is fulfilled. The variable "Dummy Wafers in Run" is set to Y4+Y5, at steps 605 and 608, when condition X3, X4, and X5 are not fulfilled.

"CALC. Total Batches per Run" in Table A is determined by first computer processor 110 by dividing the "CALC Prod Wafers in Run" in by the "Est. Batch Size" and rounding up. "EST. Batches per SETUP" represents average number of batches that can be processed before a minor setup would be required. "EST. Batches per Setup1" represents average number of batches that can be processed before a major setup would be required. "EST. Batches per Setup2" represents average number of batches that can be processed before a wafer size setup would be required. "EST. Batches per Setup3" represents data requirements for a particular scheduling or planning system. This value represents the average number of batches that can be processed before a process check on the machine is required. All of these values are provided by a human operator or input from a data file.

The Outputs in Table B show various rates and times associated with the completion of a particular process. A machine rate is usually expressed in terms of units of product processed within a given period of time (for example: wafers per hour). In order to be able to compute accurate machine rates we need to know how many wafers were processed ("CALC Prod Wafers in Run") and how long the machine had to run to process them (Calculated Machine Time Per Run). The combination of these two numbers forms the basis for what is referred to as a "run". That is to say, the amount of good product produced and the associated length of time the machine is allowed to continuously run before running out of work. In practice, the total amount of product that can be run on a particular machine with a particular process is finite, usually only several lots. Runs are also limited in length of time due to machine breakdowns or the absence of loading operators who may be away from the machine on a break or lunch.

The Table B output values shown below are all totals and are determined by first computer processor 110 by the following formulas:

(1) (a) "CALC. Machine Rate Average": Prod Wafers in Run/Total Machine Time; translated to wafers per hour. Total Machine Time is calculated by adding up all Machine Times in column 408 of FIG. 4.

(b) "CALC. Machine Rate Theoretical": Prod Wafers in Run/Total Theoretical Time; translated to wafers per hour. Total Theoretical Time is calculated by adding up all Theoretical Times in column 414 of FIG. 4.

(2) "SIM Machine Rate": Represents summarized data based on the formatting requirements for a particular scheduling or planning system which may be located in second computer processor 112.

(3) "Paragon Machine Rate": Represents summarized data based on the formatting requirements for a particular scheduling or planning system which may be located in second computer processor 112.

(4) "Total Time Per Batch": Total Machine Time/Calculated Total Batches in Run; translated to minutes.

(5) "SIM Machine Time Per Batch": Represents summarized data based on the formatting requirements for a particular scheduling or planning system which may be located in second computer processor 112 divided by number of batches.

(6) "Paragon Machine Time Per Batch": Represents summarized data based on the formatting requirements for a particular scheduling or planning system which may be located in second computer processor 112 divided by number of batches.

(7) "CALC. Butt to Butt Total Time Per Batch": Total Butt to Butt Time/Calc Total Batches in Run; translated to minutes. Total Butt to Butt Time is calculated by adding up all Butt to Butt Times in column 406 of FIG. 4.

(8) "Butt to Butt Total Time vs. Interval Total Time": Total Butt to Butt Time/Total Lot Interval Time; converted to a percent. Total Lot Interval Time is calculated by adding up all Lot Interval Times in column 410 of FIG. 4.

(9) "CALC. Labor Total Time Per Batch": Total Labor Time/Calc Total/Batches in Run; Total Labor Time is calculated by adding up all Labor Times in column 412.

(10) "Labor Total Time vs. Machine Total Time": Total Labor Time/Total Machine Time; and convert to a percent. Total Labor Time is calculated by adding up all Labor Times in column 412 of FIG. 4.

(11) "CALC. Machine Total Time Per Run": Add all Machine Times (in column 408); translate to minutes.

Values for Table E are based on the following input values provided by a human operator or from a data file: (1) PART, (2) PART FAMILY, (3) Technology (4) ROUTE, (5) Wafer Size and (6) Flash Per Wafer.

The fields (1) PART, (2) PART FAMILY and (3) Technology are all descriptive terms used to characterize the particular PART. (4) ROUTE is the identifying name for data that specifies the sequence and the number of process steps required to produce the PART. (5) Wafer Size is the physical size of the wafer, usually expressed in inches. (6) Flashes Per Wafer is the number of products or flashes found on a single wafer.

In general, the present invention can determine processing times such as times shown in columns 406, 408, 410, 412, 414, 416, and 418 and processing characteristics of a facility, piece of equipment and/or overall process. This is accomplished in one embodiment by identifying the various subprocesses that are necessary to complete a process on the machine or machines. These subprocesses are usually readily observable through the use of Industrial Engineering time study techniques. The present invention can then dynamically calculate the frequency (such as Normal Frequency in column 306) or number of times that a subprocess is repeated during a run. Each subprocess average time is multiplied by its appropriate frequency and the results are summed up to arrive at the total processing times and processing characteristics of the equipment. Since machines or manufacturing equipment generally has the capability of doing so many different unique processes it becomes a rather large task to observe each and every particular process that could ever run on the particular machine. Using the present invention and a deductive process, all of the different overall processes can be characterized by observing, recording and storing only a few representative subprocesses, representing a large saving in time and expense.

TABLE A

Experimental What-If Memory

| FACILITY PROCESS UNIT ("FPU") | SUBLOT |
|---|---|
| EST. sublot/flash Volume for FPU | 6 |
| EST. BATCH SIZE loaded on Facility (no. of wafers) | 25 |
| EST. LOT SIZE (Number of Wafers in LOT) | 25 |
| CALC. LOTS in BATCH | 1.0 |
| EST. STAGING LEVEL (# Batches) | 1 |
| EST CASCADE LEVEL (# Batches) | 1 |
| CALC. Prod Wafers in RUN | 25 |
| CALC. Dummy Wafers in RUN | 5 |
| CALC. Total BATCHES in RUN | 1 |
| EST. BATCHES per SETUP | 1 |
| EST. BATCHES per Setup1 | 1 |
| EST. BATCHES per Setup2 | 1 |
| EST. BATCHES per Setup3 | 1 |

TABLE B

Outputs

| | 1.THEORETICAL | 2.AVERAGE |
|---|---|---|
| (1) CALC MACHINE RATE (wph): | 29.16 | 23.93 |
| (2) SIM MACHINE RATE (wph): | | 23.93 |
| (3) PARAGON MACHINE RATE (wph): | | 23.93 |
| (4) CALC MACHINE TOTAL TIME PER BATCH (min): | | 62.7 |
| (5) SIM MACHINE TOTAL TIME PER BATCH (min): | | 62.7 |
| (6) PARAGON MACHINE TOTAL TIME PER BATCH (min): | | 62.7 |
| (7) CALC. BtB TOTAL TIME PER BATCH (min): | | 51.9 |
| (8) BtB TOTAL TIME vs. INTERVAL TIME TOTAL(%) | | 81% |
| (9) CALC LABOR TOTAL TIME PER BATCH (min): | | 13.3 |
| (10) LABOR TOTAL TIME vs. MACHINE TOTAL TIME (%): | | 21% |
| (11) CALC MACHINE TOTAL TIME PER RUN (MIN): | | 62.7 |

TABLE C

Conditions

| I.CONDITION | DESCRIPTION | FIG. # |
|---|---|---|
| X1 | (Lot Size > Batch Size ) AND (ROUNDUP (Lot Size/Batch Size) >= MAXIMUM { Stage Level, Cascade Level } | FIG. 5 |
| X2 | REMAINDER ( ROUNDUP( MAXIMUM { Batch Size * MAXIMUM { Stage Level, Cascade Level }. Lot Size })/Lot Size ) = 0 | FIG. 5 |
| X3 | (Facility Process Unit is not "sublot" ) OR (FPU Volume = 1 ) | FIG. 6 |
| X4 | REMAINDER( MINIMUM { Lot Size * Cascade Level, Batch Size * Cascade Level, Prod Wafers in Run }/FPU Volume ) = 0 | FIG. 6 |
| X5 | REMAINDER( REMAINDER (Prod Wafers in Run/MINIMUM { Lot Size * Cascade Level, Batch Size * Cascade Level, Prod Wafers in Run })/FPU Volume) = 0 | FIG. 6 |
| X6 | (Facility Process Unit is "flash") AND (Subprocess Type is "Process") | FIG. 7 |
| X7 | (Facility Process Unit is "sublot") AND (Subprocess Type is "Process") | FIG.7,8,9 |
| X8 | Staging Flag <> "Y" and Subprocess Type is not "FirstPc" and Subprocess Type is not "Transaft" | FIG.14A |

TABLE D

| VALUE | DESCRIPTION | FIG. # |
|---|---|---|
| Y1 | MINIMUM{ROUNDUP(MAXIMUM{Batch Size * MAXIMUM{Stage Level, Cascade Level}, Lot Size}), Lot Size } | FIG. 5 |
| Y2 | ROUNDUP(MAXIMUM{Batch Size * MAXIMUM{Stage Level, Cascade Level}, Lot Size}} | FIG. 5 |
| Y3 | Lot Size - REMAINDER(ROUNDUP(MAXIMUM{Batch Size * MAXIMUM{Stage Level, Cascade Level}, Lot Size })/Lot Size)) | FIG. 5 |
| Y4 | (FPU Volume - REMAINDER(MINIMUM{Lot Size * Cascade Level, Batch Size * Cascade Level, Prod Wafers in Run }/FPU Volume) * INTEGER(Prod Wafers in Run/(MINIMUM{Lot Size * Cascade Level, Batch Size*Cascade Level}))) | FIG. 6 |
| Y5 | FPU Volume - REMAINDER(REMAINDER(Prod Wafers in Run/((MINIMUM{Lot Size * Cascade Level, Batch Size * Cascade Level, Prod Wafers in Run}/FPU Volume)) | FIG. 6 |
| Y6 | MAXIMUM{0, MINIMUM{IF Override is negative THEN Normal Frequency + Override ELSE Override, Normal Frequency}} | FIG. 8 |
| Y7 | MAXIMUM{0, MINIMUM{IF Override is negative THEN Normal Frequency + (Override * Prod Wafers in Run)ELSE Override * Prod Wafers in Run, Normal Frequency}} | FIG. 8 |
| Y8 | MAXIMUM{0, MINIMUM{IF Override is negative THEN Normal Frequency + (Override * Batches in Run,) ELSE Override * Batches in Run, Normal Frequency}} | FIG. 8 |
| Y9 | MAXIMUM{0, MINIMUM(IF Override is negative THEN INTEGER(Prod Wafers in Run/FPU Volume) * ( FPU Volume + Override) + MAXIMUM{0, REMAINDER(Prod Wafers in Run/FPU Volume) + Override }ELSE INTEGER(Prod Wafers in Run/FPU Volume) * Override + MINIMUM{ Override, REMAINDER(Prod Wafers in Run/FPU Volume)}, Normal Frequency}} | FIG. 8 |
| Y10 | MAXIMUM{0, MINIMUM{IF Path1_Occ is negative THEN Normal Frequency + Path1_Occ ELSE Path1_Occ, IF Override is a number THEN Normal Frequency - Override Frequency ELSE Normal Frequency}} | FIG. 9 |
| Y11 | MAXIMUM{0, MINIMUM(IF Path1_Occ is negative THEN Normal Frequency + (Path1_Occ * Prod Wafers in Run)ELSE Path1_Occ * Prod Wafers in Run, IF Override is a number THEN Normal Frequency - Override Frequency ELSE Normal Frequency}} | FIG. 9 |
| Y12 | MAXIMUM{0, MINIMUM{IF Path1_Occ is negative THEN Normal Frequency + (Path1_Occ * Batches in Run) ELSE Path1_Occ * Batches in Run, IF Override is a number THEN Normal Frequency - Override Frequency ELSE Normal Frequency}} | FIG. 9 |
| Y13 | MAXIMUM{0, MINIMUM{IF Path1_Occ is negative THEN INTEGER(Prod Wafers in Run/FPU Volume) * ( FPU Volume + Path1_Occ) + MAXIMUM{ 0, REMAINDER(Prod Wafers in Run/FPU Volume) + Path1_Occ }ELSE INTEGER(Prod Wafers in Run/FPU Volume) * Path1_Occ + MINIMUM{ Path1_Occ, REMAINDER(Prod Wafers in Run/FPU Volume)}, IF Override is a number THEN Normal Frequency - Override Frequency ELSE Normal Frequency}} | FIG. 9 |
| Y14 | MAXIMUM{0, MINIMUM{IF Path2_Occ is negative THEN Normal Frequency + Path2_Occ ELSE Path2_Occ, IF Override is a number THEN Normal Frequency - Override Frequency ELSE Normal Frequency}} | FIG. 10 |
| Y15 | MAXIMUM{0, MINIMUM{IF Path2_Occ is negative THEN Normal Frequency + (Path2_Occ * Prod Wafers in Run)ELSE Path2_Occ * Prod Wafers in Run, IF Override is a number THEN Normal Frequency - Override Frequency ELSE Normal Frequency }} | FIG. 10 |
| Y16 | MAXIMUM{0, MINIMUM{IF Path2_Occ is negative THEN Normal Frequency + (Path2_Occ * Batches in Run)ELSE Path2_Occ * Batches in Run, IF Override is a number THEN Normal Frequency - Override Frequency ELSE Normal Frequency}} | FIG. 10 |
| Y17 | MAXIMUM{0, MINIMUM{IF Path2_Occ is negative THEN INTEGER(Prod Wafers in Run/FPU Volume) * (FPU Volume + Path2_Occ) + MAXIMUM{ 0, REMAINDER(Prod Wafers in Run/FPU Volume) + Path2_Occ }ELSE INTEGER(Prod Wafers in Run/FPU Volume) * Path2_Occ + MINIMUM{ Path2_Occ, REMAINDER(Prod Wafers in Run/FPU Volume)), IF Override is a number THEN Normal Frequency - Override Frequency ELSE Normal Frequency}} | FIG. 10 |
| Y18 | MINIMUM{Staging Level, MAXIMUM{1, IF Override Frequency is a number THEN Override Frequency + MAXIMUM{Path1 Frequency, Path2 Frequency}ELSE Normal Frequency}} | FIG. 12 |
| Y19 | IF Time Per = "batch" THEN 1 ELSE IF Time Per = "lot" THEN Lots in Batch ELSE IF Time Per = "wafer THEN Batch Size ELSE IF Time Per = "flash" THEN Subprocess Volume ELSE IF Time Per = "sublot" THEN Batch Size/ Subprocess Volume ELSE "ERROR") | FIG. 12 |
| Y20 | MAXIMUM{0, Normal Frequency - MAXIMUM{Path1 Frequency, Path2 Frequency}} | FIG. 13A |
| Y21 | SUM{IF Path1 Total Time >= Path2 Total Time THEN Path1 Frequency ELSE Path2 Frequency}) | FIG. 13A |
| Y22 | IF Setup Multiplier > 0 THEN Setup Multiplier ELSE 1 | FIG. 13A |
| Y23 | IF Stage Cascade Divisor > 0 THEN Stage Cascade Divisor ELSE 1 | FIG. 13A |
| Y24 | IF Labor Percent > 0 THEN Labor Percent ELSE 100% | FIG. 13D |

TABLE D-continued

| VALUE | DESCRIPTION | FIG. # |
|---|---|---|
| Y25 | IF Subprocess Type < > "FirstPc" THEN IF Stage Cascade Divisor > 0 THEN Stage Cascade Divisor ELSE 1 ELSE 1 | FIG. 13D |
| Y26 | IF Setup Multiplier > 0 THEN Setup Multiplier ELSE 1 | FIG. 14B |
| Y27 | IF Stage Cascade Divisor > 0 THEN Stage Cascade Divisor ELSE 1 | FIG. 14B, D |

TABLE E

Part Specific Data

| PART | 1234ABCDWF |
|---|---|
| PART FAMILY | COMPUTER |
| Technology | .9 DIGITAL |
| ROUTE | LOG123 |
| Wafer Size | 5 |
| Flash Per Wafer | 93 |

I claim:

1. A method comprised of the steps of:

storing a first time and a first indicia;

the first time being the time it takes a first number of products to be subjected to a first subprocess;

the first indicia being an indication of how many products are in the first number of products;

storing a second time and a second indicia;

the second time being the time it takes a second number of products to be subjected to a second subprocess;

and the second indicia being an indication of how many products are in the second number of products;

storing a third indicia, the third indicia being an indication of how many products are in a third number of products to be subjected to a first process, said first process being comprised of the first and second subprocesses;

determining a run time for the third number of products to be subjected to the first process based on the first and second times, and the first, second and third indicia; and wherein the first time is a first average time it takes for a first number of products to be subjected to a first subprocess for a plurality of different processes; and the second time is a second average time it takes for a second number of products to be subjected to a second subprocess for a plurality of different processes.

2. The method of claim 1 and further wherein:

the step of determining the run time for the third number of products includes;

determining a fourth indicia, the fourth indicia being an indication of how many times the first subprocess needs to be repeated during the first process in order to process the third number of products;

determining a fifth indicia, the fifth indicia being an indication of how many times the second subprocess needs to be repeated during the first process in order to process the third number of products.

3. The method of claim 1 further comprising the steps of:

storing a plurality of further times and a corresponding plurality of further indicia;

each of the plurality of further times being a time it takes for one of a plurality of further numbers of products to be subjected to one of a plurality of further subprocesses;

the plurality of further indicia being an indication of how many products are in each of the plurality of further numbers of products;

wherein the run time for the third number of products to be subjected to the first process is determined based on the plurality of further times and the plurality of further indicia.

4. The method of claim 1 wherein:

the first number of products, the second number of products, and the third number of products are numbers of semiconductor wafers.

5. A method comprised of the steps of:

storing a first time and a first indicia;

the first time being the time it takes a first number of products to be subjected to a first subprocess;

the first indicia being an indication of how many products are in the first number of products;

storing a second time and a second indicia;

the second time being the time it takes a second number of products to be subjected to a second subprocess;

and the second indicia being an indication of how many products are in the second number of products;

storing a third indicia, the third indicia being an indication of how many products are in a third number of products to be subjected to a first process, said first process being comprised of the first and second subprocesses;

determining a run time for the third number of products to be subjected to the first process based on the first and second times, and the first, second and third indicia; and determining a new run time based on a new first time, the second time, and the first, second, and third indicia.

6. The method of claim 5 and further comprising the steps of:

comparing the new run time versus the run time; and if the new run time is less than the run time, then replacing the value for the first time with the value for the new first time and determining subsequent run times based on the new first time, and the first, second and third indicia.

7. A method comprised of the steps of:

storing a first average time and a first indicia;

the first average time being the average time it takes for a first number of products to be subjected to a first subprocess for a plurality of different processes;

the first indicia being an indication of how many products are in the first number of products;

storing a second average time and a second average indicia;

the second average time being the average time it takes a second number of products to be subjected to a second subprocess for a plurality of different processes and the second indicia being an indication of how many products are in the second number of products;

storing a third indicia, the third indicia being an indication of how many products are in a third number of products to be subjected to a first process, said first process being comprised of the first and second subprocesses;

storing a first override flag for the first process which when activated indicates that the first average time should be replaced by a first process specific time; and determining a run time for the third number of products to be subjected to the first process based on the first process specific time if the first override flag is set, and the second average time, and the first, second, and third indicia.

8. The method of claim 7 and further comprising the step of:

determining the run time based on the first average time when the first override flag is not set.

9. An apparatus comprised of:

a first memory;

a second memory; and a a first computer processor;

wherein the first memory includes a first process specific time for a first subprocess as occurring within a first process and a first override flag;

wherein the second memory includes a first average time for the first subprocess as occurring within a plurality of processes;

and wherein the first computer processor ignores the first average time for the first subprocess and uses the first process specific time for determining the run time of the first process when the first override flag in the first memory is set; said first process including the first subprocess.

10. An apparatus comprised of a computer memory; and a computer processor;

wherein a first time and a first indicia are stored in the computer memory, the first time being the time it takes a first number of products to be subjected to a first subprocess and the first indicia being an indication of how many products are in the first number of products;

wherein a second time and a second indicia are stored in the computer memory, the second time being the time it takes a second number of products to be subjected to a second subprocess, and the second indicia being an indication of how many products are in the second number of products;

wherein a third indicia is stored in the computer memory, the third indicia being an indication of how many products are in a third number of products to be subjected to a first process, said first process being comprised of the first and second subprocesses;

wherein the computer processor determines a run time for the third number of products to be subjected to the first process based on the first and second times, and the first, second and third indicia;

wherein the first time is a first average time it takes for a first number of products to be subjected to a first subprocess for a plurality of different processes; and the second time is a second average time it takes for a second number of products to be subjected to a second subprocess for a plurality of different processes.

11. The apparatus of claim 10 wherein when the computer processor determines the run time for the third number of products includes, the computer processor determines a fourth indicia, the fourth indicia being an indication of how many times the first subprocess needs to be repeated during the first process in order to process the third number of products;

and when the computer processor determines the run time for the third number of products, the computer processor determines a fifth indicia, the fifth indicia being an indication of how many times the second subprocess needs to be repeated during the first process in order to process the third number of products.

12. The apparatus of claim 10 wherein a plurality of further times and a corresponding plurality of further indicia are stored in the computer memory;

each of the plurality of further times being a time it takes for one of a plurality of further numbers of products to be subjected to one of a plurality of further subprocesses;

the plurality of further indicia being an indication of how many products are in each of the plurality of further numbers of products;

wherein the run time for the third number of products to be subjected to the first process is determined by the computer processor based on the plurality of further times and the plurality of further indicia.

13. The apparatus of claim 10 wherein:

the first number of products, the second number of products, and the third number of products are numbers of semiconductor wafers.

14. A apparatus comprising a computer memory; and a computer processor;

wherein a first time and a first indicia are stored in the computer memory, the first time being the time it takes a first number of products to be subjected to a first subprocess, the first indicia being an indication of how many products are in the first number of products;

wherein a second time and a second indicia are stored in the computer memory, the second time being the time it takes a second number of products to be subjected to a second subprocess, and the second indicia being an indication of how many products are in the second number of products;

wherein a third indicia is stored in the computer memory, the third indicia being an indication of how many products are in a third number of products to be subjected to a first process, said first process being comprised of the first and second subprocesses;

wherein the computer processor determines a run time for the third number of products to be subjected to the first process based on the first and second times, and the first, second and third indicia; and wherein the computer processor determines a new run time based on a new first time, the second time, and the first, second, and third indicia.

15. The apparatus of claim 14 wherein the computer processor compares the new run time versus the run time; and if the new run time is less than the run time, the computer processor replaces the value for the first time with the value for the new first time and determines subsequent run times based on the new first time, and the first, second and third indicia.

16. An apparatus comprising a computer memory; and a computer processor;

wherein a first average time and a first indicia are stored in the computer memory, the first average time being the average time it takes for a first number of products to be subjected to a first subprocess for a plurality of different processes, and the first indicia being an indication of how many products are in the first number of products;

wherein a second average time and a second average indicia are stored in the computer memory, the second average time being the average time it takes a second number of products to be subjected to a second subprocess for a plurality of different processes, and the second indicia being an indication of how many products are in the second number of products;

wherein a third indicia is stored in the computer memory, the third indicia being an indication of how many products are in a third number of products to be subjected to a first process, said first process being comprised of the first and second subprocesses;

wherein a first override flag for the first process is stored in the computer memory which when activated indicates that the first average time should be replaced by a first process specific time; and wherein the computer processor determines a run time for the third number of products to be subjected to the first process based on the first process specific time if the first override flag is set, and the second average time, and the first, second, and third indicia.

17. The apparatus of claim 16 wherein the computer processor determines the run time based on the first average time when the first override flag is not set.

* * * * *